(12) United States Patent
Adest et al.

(10) Patent No.: US 10,705,551 B2
(45) Date of Patent: Jul. 7, 2020

(54) CIRCUIT FOR INTERCONNECTED DIRECT CURRENT POWER SOURCES

(71) Applicant: Solaredge Technologies Ltd., Herzeliya (IL)

(72) Inventors: Meir Adest, Raanana (IL); Ilan Yoscovich, Ramat-Gan (IL); Yoav Galin, Raanana (IL); Elad Sity, Hod Hasharon (IL)

(73) Assignee: Solaredge Technologies Ltd., Herzeliya (IL)

(*) Notice: Subject to any disclaimer, the term of this patent is extended or adjusted under 35 U.S.C. 154(b) by 0 days.

(21) Appl. No.: 15/831,850

(22) Filed: Dec. 5, 2017

(65) Prior Publication Data

US 2018/0224877 A1 Aug. 9, 2018

Related U.S. Application Data

(63) Continuation of application No. 14/401,049, filed as application No. PCT/US2013/042354 on May 23, 2013, now Pat. No. 9,870,016.

(60) Provisional application No. 61/651,834, filed on May 25, 2012.

(51) Int. Cl.
| | | |
|---|---|---|
| *G05F 1/67* | (2006.01) | |
| *H02J 3/38* | (2006.01) | |
| *H02J 1/00* | (2006.01) | |
| *H02M 7/49* | (2007.01) | |

(52) U.S. Cl.
CPC .............. *G05F 1/67* (2013.01); *H02J 1/00* (2013.01); *H02J 3/385* (2013.01); *H02M 7/49* (2013.01); *Y02E 10/58* (2013.01); *Y10T 307/685* (2015.04)

(58) Field of Classification Search
CPC .... G05F 1/67; H02J 1/00; H02J 3/385; Y10T 307/685; H02M 7/49; Y02E 10/58
USPC .......................................................... 307/77
See application file for complete search history.

(56) References Cited

U.S. PATENT DOCUMENTS

| | | |
|---|---|---|
| 2,758,219 A | 8/1956 | Miller |
| 3,369,210 A | 2/1968 | Manickella |
| 3,596,229 A | 7/1971 | Hohorst |
| 3,958,136 A | 5/1976 | Schroeder |
| 4,060,757 A | 11/1977 | McMurray |
| 4,101,816 A | 7/1978 | Shepter |

(Continued)

FOREIGN PATENT DOCUMENTS

| | | |
|---|---|---|
| CN | 1309451 A | 8/2001 |
| CN | 1122905 C | 10/2003 |

(Continued)

OTHER PUBLICATIONS

QT Technical Application Papers, "ABB Circuit-Breakers for Direct current Applications", ABB SACE S.p.A., An ABB Group Company, L.V. Breakers, Via Baioni, 35, 24123 Bergamo-Italy, Tel.: +39 035.395.111—Telefax: +39 035.395306-433, Sep. 2007.

(Continued)

*Primary Examiner* — Hal Kaplan
(74) *Attorney, Agent, or Firm* — Banner & Witcoff, Ltd.

(57) ABSTRACT

Controlling a power converter circuit for a direct current (DC) power source is disclosed. The power converter may be operative to convert input power received from the DC power source to an output power and to perform maximum power point tracking of the power source. The power converter is adapted to provide the output power to a load that also performs maximum power point tracking.

24 Claims, 16 Drawing Sheets

(56) References Cited

U.S. PATENT DOCUMENTS

| | | |
|---|---|---|
| 4,146,785 A | 3/1979 | Neale |
| 4,161,771 A | 7/1979 | Bates |
| 4,171,861 A | 10/1979 | Hohorst |
| 4,257,087 A | 3/1981 | Cuk |
| 4,296,461 A | 10/1981 | Mallory et al. |
| 4,346,341 A | 8/1982 | Blackburn et al. |
| 4,452,867 A | 6/1984 | Conforti |
| 4,460,232 A | 7/1984 | Sotolongo |
| 4,481,654 A | 11/1984 | Daniels et al. |
| 4,549,254 A | 10/1985 | Kissel |
| 4,554,515 A | 11/1985 | Burson et al. |
| 4,598,330 A | 7/1986 | Woodworth |
| 4,602,322 A | 7/1986 | Merrick |
| 4,623,753 A | 11/1986 | Feldman et al. |
| 4,637,677 A | 1/1987 | Barkus |
| 4,639,844 A | 1/1987 | Gallios et al. |
| 4,641,042 A | 2/1987 | Miyazawa |
| 4,641,079 A | 2/1987 | Kato et al. |
| 4,644,458 A | 2/1987 | Harafuji et al. |
| 4,652,770 A | 3/1987 | Kumano |
| 4,685,040 A | 8/1987 | Steigerwald et al. |
| 4,686,617 A | 8/1987 | Colton |
| 4,706,181 A | 11/1987 | Mercer |
| 4,720,667 A | 1/1988 | Lee et al. |
| 4,720,668 A | 1/1988 | Lee et al. |
| 4,783,728 A | 11/1988 | Hoffman |
| RE33,057 E | 9/1989 | Clegg et al. |
| 4,864,213 A | 9/1989 | Kido |
| 4,868,379 A | 9/1989 | West |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,906,859 A | 3/1990 | Kobayashi et al. |
| 4,910,518 A | 3/1990 | Kim et al. |
| 4,978,870 A | 12/1990 | Chen et al. |
| 4,987,360 A | 1/1991 | Thompson |
| 5,045,988 A | 9/1991 | Gritter et al. |
| 5,081,558 A | 1/1992 | Mahler |
| 5,191,519 A | 3/1993 | Kawakami |
| 5,280,232 A | 1/1994 | Kohl et al. |
| 5,287,261 A | 2/1994 | Ehsani |
| 5,289,361 A | 2/1994 | Vinciarelli |
| 5,327,071 A | 7/1994 | Frederick et al. |
| 5,345,375 A | 9/1994 | Mohan |
| 5,402,060 A | 3/1995 | Erisman |
| 5,446,645 A | 8/1995 | Shirahama et al. |
| 5,460,546 A | 10/1995 | Kunishi et al. |
| 5,493,154 A | 2/1996 | Smith et al. |
| 5,497,289 A | 3/1996 | Sugishima et al. |
| 5,517,378 A | 5/1996 | Asplund et al. |
| 5,530,335 A | 6/1996 | Decker et al. |
| 5,548,504 A | 8/1996 | Takehara |
| 5,563,780 A | 10/1996 | Goad |
| 5,604,430 A | 2/1997 | Decker et al. |
| 5,616,913 A | 4/1997 | Litterst |
| 5,644,219 A | 7/1997 | Kurokawa |
| 5,646,501 A | 7/1997 | Fishman et al. |
| 5,659,465 A | 8/1997 | Flack et al. |
| 5,686,766 A | 11/1997 | Tamechika |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,905,645 A | 5/1999 | Cross |
| 5,917,722 A | 6/1999 | Singh |
| 5,919,314 A | 7/1999 | Kim |
| 5,923,158 A | 7/1999 | Kurokami et al. |
| 5,930,128 A | 7/1999 | Dent |
| 5,932,994 A | 8/1999 | Jo et al. |
| 5,933,327 A | 8/1999 | Leighton et al. |
| 5,945,806 A | 8/1999 | Faulk |
| 5,949,668 A | 9/1999 | Schweighofer |
| 5,961,739 A | 10/1999 | Osborne |
| 5,963,010 A | 10/1999 | Hayashi et al. |
| 5,990,659 A | 11/1999 | Frannhagen |
| 6,002,290 A | 12/1999 | Avery et al. |
| 6,031,736 A | 2/2000 | Takehara et al. |
| 6,037,720 A | 3/2000 | Wong et al. |
| 6,038,148 A | 3/2000 | Farrington et al. |
| 6,046,919 A | 4/2000 | Madenokouji et al. |
| 6,050,779 A | 4/2000 | Nagao et al. |
| 6,078,511 A | 6/2000 | Fasullo et al. |
| 6,081,104 A | 6/2000 | Kern |
| 6,082,122 A | 7/2000 | Madenokouji et al. |
| 6,087,738 A | 7/2000 | Hammond |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,219,623 B1 | 4/2001 | Wills |
| 6,255,360 B1 | 7/2001 | Domschke et al. |
| 6,256,234 B1 | 7/2001 | Keeth et al. |
| 6,259,234 B1 | 7/2001 | Perol |
| 6,262,558 B1 | 7/2001 | Weinberg |
| 6,285,572 B1 | 9/2001 | Onizuka et al. |
| 6,292,379 B1 | 9/2001 | Edevold et al. |
| 6,301,128 B1 | 10/2001 | Jang et al. |
| 6,304,065 B1 | 10/2001 | Wittenbreder |
| 6,320,769 B2 | 11/2001 | Kurokami et al. |
| 6,339,538 B1 | 1/2002 | Handleman |
| 6,351,130 B1 | 2/2002 | Preiser et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,433,522 B1 | 8/2002 | Siri |
| 6,441,597 B1 | 8/2002 | Lethellier |
| 6,448,489 B2 | 9/2002 | Kimura et al. |
| 6,452,814 B1 | 9/2002 | Wittenbreder |
| 6,469,919 B1 | 10/2002 | Bennett |
| 6,483,203 B1 | 11/2002 | McCormack |
| 6,493,246 B2 | 12/2002 | Suzui et al. |
| 6,507,176 B2 | 1/2003 | Wittenbreder, Jr. |
| 6,531,848 B1 | 3/2003 | Chitsazan et al. |
| 6,545,211 B1 | 4/2003 | Mimura |
| 6,548,205 B2 | 4/2003 | Leung et al. |
| 6,587,051 B2 | 7/2003 | Takehara et al. |
| 6,590,793 B1 | 7/2003 | Nagao et al. |
| 6,593,521 B2 | 7/2003 | Kobayashi |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,650,031 B1 | 11/2003 | Goldack |
| 6,650,560 B2 | 11/2003 | MacDonald et al. |
| 6,653,549 B2 | 11/2003 | Matsushita et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,781 B1 | 2/2004 | Kroker |
| 6,731,136 B2 | 5/2004 | Knee |
| 6,738,692 B2 | 5/2004 | Schienbein et al. |
| 6,744,643 B2 | 6/2004 | Luo et al. |
| 6,765,315 B2 | 7/2004 | Hammerstrom et al. |
| 6,768,047 B2 | 7/2004 | Chang et al. |
| 6,788,033 B2 | 9/2004 | Vinciarelli |
| 6,788,146 B2 | 9/2004 | Forejt et al. |
| 6,795,318 B2 | 9/2004 | Haas et al. |

(56) References Cited

U.S. PATENT DOCUMENTS

| | | |
|---|---|---|
| 6,801,442 B2 | 10/2004 | Suzui et al. |
| 6,810,339 B2 | 10/2004 | Wills |
| 6,850,074 B2 | 2/2005 | Adams et al. |
| 6,882,131 B1 | 4/2005 | Takada et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 | 1/2006 | Notman |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,148,669 B2 | 12/2006 | Maksimovic et al. |
| 7,158,359 B2 | 1/2007 | Bertele et al. |
| 7,158,395 B2 | 1/2007 | Deng et al. |
| 7,174,973 B1 | 2/2007 | Lysaght |
| 7,193,872 B2 | 3/2007 | Siri |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,291,036 B1 | 11/2007 | Daily et al. |
| RE39,976 E | 1/2008 | Schiff et al. |
| 7,336,056 B1 | 2/2008 | Dening |
| 7,348,802 B2 | 3/2008 | Kasanyal et al. |
| 7,352,154 B2 | 4/2008 | Cook |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,394,237 B2 | 7/2008 | Chou et al. |
| 7,420,815 B2 | 9/2008 | Love |
| 7,435,134 B2 | 10/2008 | Lenox |
| 7,435,897 B2 | 10/2008 | Russell |
| 7,443,052 B2 | 10/2008 | Wendt et al. |
| 7,456,523 B2 | 11/2008 | Kobayashi |
| 7,471,014 B2 | 12/2008 | Lum et al. |
| 7,495,419 B1 | 2/2009 | Ju |
| 7,504,811 B2 | 3/2009 | Watanabe et al. |
| 7,589,437 B2 | 9/2009 | Henne et al. |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,612,283 B2 | 11/2009 | Toyomura et al. |
| 7,646,116 B2 | 1/2010 | Batarseh et al. |
| 7,709,727 B2 | 5/2010 | Roehrig et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,812,701 B2 | 10/2010 | Lee et al. |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,945,413 B2 | 5/2011 | Krein |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,018,748 B2 | 9/2011 | Leonard |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,098,055 B2 | 1/2012 | Avrutsky et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,914 B2 | 3/2012 | Wong et al. |
| 8,184,460 B2 | 5/2012 | O'Brien et al. |
| 8,204,709 B2 | 6/2012 | Presher, Jr. et al. |
| 8,289,742 B2 | 10/2012 | Adest et al. |
| 8,415,937 B2 | 4/2013 | Hester |
| 8,436,592 B2 | 5/2013 | Saitoh |
| 8,570,017 B2 | 10/2013 | Perichon et al. |
| 2001/0023703 A1 | 9/2001 | Kondo et al. |
| 2001/0034982 A1 | 11/2001 | Nagao et al. |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0058662 A1 | 3/2003 | Baudelot et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0004402 A1 | 1/2004 | Kippley |
| 2004/0041548 A1 | 3/2004 | Perry |
| 2004/0061527 A1 | 4/2004 | Knee |
| 2004/0125618 A1 | 7/2004 | De Rooij et al. |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0121067 A1 | 6/2005 | Toyomura et al. |
| 2005/0162018 A1 | 7/2005 | Realmuto et al. |
| 2005/0172995 A1 | 8/2005 | Rohrig et al. |
| 2005/0194937 A1 | 9/2005 | Jacobs |
| 2005/0226017 A1 | 10/2005 | Kotsopoulos et al. |
| 2005/0281064 A1 | 12/2005 | Olsen et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |

(56) References Cited

U.S. PATENT DOCUMENTS

| | | |
|---|---|---|
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0013349 A1 | 1/2007 | Bassett |
| 2007/0030068 A1 | 2/2007 | Motonobu et al. |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0133241 A1 | 6/2007 | Mumtaz et al. |
| 2007/0147075 A1 | 6/2007 | Bang |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0247877 A1 | 10/2007 | Kwon et al. |
| 2007/0273342 A1 | 11/2007 | Kataoka et al. |
| 2007/0290636 A1 | 12/2007 | Beck et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0218152 A1 | 9/2008 | Bo |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0303503 A1 | 12/2008 | Wolfs |
| 2009/0039852 A1 | 2/2009 | Fishelov et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0121549 A1 | 5/2009 | Leonard |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0184746 A1 | 7/2009 | Fahrenbruch |
| 2009/0190275 A1 | 7/2009 | Gilmore et al. |
| 2009/0206666 A1 | 8/2009 | Sella et al. |
| 2009/0217965 A1 | 9/2009 | Dougal et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0273241 A1 | 11/2009 | Gazit et al. |
| 2009/0282755 A1 | 11/2009 | Abbott et al. |
| 2009/0284998 A1 | 11/2009 | Zhang et al. |
| 2009/0322494 A1 | 12/2009 | Lee |
| 2010/0001587 A1 | 1/2010 | Casey et al. |
| 2010/0052735 A1 | 3/2010 | Burkland et al. |
| 2010/0085670 A1 | 4/2010 | Palaniswami et al. |
| 2010/0124027 A1 | 5/2010 | Handelsman et al. |
| 2010/0127571 A1 | 5/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver, II et al. |
| 2010/0294528 A1 | 11/2010 | Sella et al. |
| 2010/0294903 A1 | 11/2010 | Shmukler et al. |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0037600 A1 | 2/2011 | Takehara et al. |
| 2011/0043172 A1 | 2/2011 | Dearn |
| 2011/0079263 A1 | 4/2011 | Avrutsky |
| 2011/0084553 A1 | 4/2011 | Adest et al. |
| 2011/0114154 A1 | 5/2011 | Lichy et al. |
| 2011/0115295 A1 | 5/2011 | Moon et al. |
| 2011/0121652 A1 | 5/2011 | Sella et al. |
| 2011/0125431 A1 | 5/2011 | Adest et al. |
| 2011/0133552 A1 | 6/2011 | Binder et al. |
| 2011/0134668 A1 | 6/2011 | Cho |
| 2011/0139213 A1 | 6/2011 | Lee |
| 2011/0140536 A1 | 6/2011 | Adest et al. |
| 2011/0160930 A1 | 6/2011 | Batten et al. |
| 2011/0181251 A1 | 7/2011 | Porter et al. |
| 2011/0181340 A1 | 7/2011 | Gazit |
| 2011/0210611 A1 | 9/2011 | Ledenev et al. |
| 2011/0227411 A1 | 9/2011 | Arditi |
| 2011/0254372 A1 | 10/2011 | Haines et al. |
| 2011/0260866 A1 | 10/2011 | Avrutsky et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0007613 A1 | 1/2012 | Gazit |
| 2012/0019966 A1 | 1/2012 | DeBoer |
| 2012/0032515 A1 | 2/2012 | Ledenev et al. |
| 2012/0048325 A1 | 3/2012 | Matsuo et al. |
| 2012/0081009 A1 | 4/2012 | Shteynberg et al. |
| 2012/0091810 A1 | 4/2012 | Aiello et al. |
| 2012/0113554 A1 | 5/2012 | Paoletti et al. |

FOREIGN PATENT DOCUMENTS

| | | |
|---|---|---|
| CN | 1841254 A | 10/2006 |
| CN | 101136129 A | 3/2008 |
| CN | 101488271 A | 7/2009 |
| CN | 101523230 A | 9/2009 |
| DE | 19737286 A1 | 3/1999 |
| DE | 102005030907 A1 | 1/2007 |
| DE | 102008057874 A1 | 5/2010 |
| EP | 419093 A2 | 3/1991 |
| EP | 420295 A1 | 4/1991 |
| EP | 604777 A1 | 7/1994 |
| EP | 756178 A2 | 1/1997 |
| EP | 827254 A2 | 3/1998 |
| EP | 1039621 A2 | 9/2000 |
| EP | 1047179 A1 | 10/2000 |
| EP | 1330009 A2 | 7/2003 |
| EP | 1503490 A1 | 2/2005 |

(56) References Cited

FOREIGN PATENT DOCUMENTS

| | | |
|---|---|---|
| EP | 1531542 A2 | 5/2005 |
| EP | 1531545 A2 | 5/2005 |
| EP | 1657557 A1 | 5/2006 |
| EP | 1657797 A1 | 5/2006 |
| EP | 1887675 A2 | 2/2008 |
| EP | 2048679 A1 | 4/2009 |
| EP | 2315328 A2 | 4/2011 |
| EP | 2393178 A2 | 12/2011 |
| ES | 2249147 A1 | 3/2006 |
| ES | 2249149 A1 | 3/2006 |
| GB | 2476508 A | 6/2011 |
| GB | 2480015 A | 11/2011 |
| GB | 2480015 B | 12/2011 |
| JP | 61065320 A | 4/1986 |
| JP | 8009557 A | 1/1996 |
| JP | 11041832 A | 2/1999 |
| JP | 11103538 A | 4/1999 |
| JP | 11206038 A | 7/1999 |
| JP | 11289891 A | 10/1999 |
| JP | 11318042 A | 11/1999 |
| JP | 2000174307 A | 6/2000 |
| JP | 2000339044 A | 12/2000 |
| JP | 2001189476 A | 7/2001 |
| JP | 2002300735 A | 10/2002 |
| JP | 2003124492 A | 4/2003 |
| JP | 2003134667 A | 5/2003 |
| JP | 2004194500 A | 7/2004 |
| JP | 2004260944 A | 9/2004 |
| JP | 2004334704 A | 11/2004 |
| JP | 2005192314 A | 7/2005 |
| JP | 2007058845 A | 3/2007 |
| JP | 201166976 A | 3/2011 |
| WO | 1993013587 A1 | 7/1993 |
| WO | 1996013093 A1 | 5/1996 |
| WO | 1998023021 A2 | 5/1998 |
| WO | 00/00839 A1 | 1/2000 |
| WO | 00/21178 A1 | 4/2000 |
| WO | 0075947 A1 | 12/2000 |
| WO | 0231517 | 4/2002 |
| WO | 2003050938 A2 | 6/2003 |
| WO | 2003071655 A1 | 8/2003 |
| WO | 2004023278 A2 | 3/2004 |
| WO | 2004090993 A2 | 10/2004 |
| WO | 2004098261 A2 | 11/2004 |
| WO | 2004107543 A2 | 12/2004 |
| WO | 2005076444 A1 | 8/2005 |
| WO | 2005076445 A1 | 8/2005 |
| WO | 2006005125 A1 | 1/2006 |
| WO | 2006007198 A1 | 1/2006 |
| WO | 2006078685 A2 | 7/2006 |
| WO | 2007006564 A2 | 1/2007 |
| WO | 2007048421 A2 | 5/2007 |
| WO | 2007073951 A1 | 7/2007 |
| WO | 2007084196 A2 | 7/2007 |
| WO | 2007090476 A2 | 8/2007 |
| WO | 2007113358 A1 | 10/2007 |
| WO | 2008008528 A2 | 1/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009007782 A2 | 1/2009 |
| WO | 2009046533 A1 | 4/2009 |
| WO | 2009051853 A1 | 4/2009 |
| WO | 2009051870 A1 | 4/2009 |
| WO | 2009073868 A1 | 6/2009 |
| WO | 2009118682 A2 | 10/2009 |
| WO | 2009118683 A2 | 10/2009 |
| WO | 2009136358 A1 | 11/2009 |
| WO | 2009140539 A2 | 11/2009 |
| WO | 2010/002960 A1 | 1/2010 |
| WO | 2010065043 A1 | 6/2010 |
| WO | 2010065388 A1 | 6/2010 |
| WO | 2010072717 A1 | 7/2010 |
| WO | 2010078303 A2 | 7/2010 |
| WO | 2010094012 A1 | 8/2010 |
| WO | 20100134057 A1 | 11/2010 |
| WO | 2011011711 A2 | 1/2011 |
| WO | 2011017721 A1 | 2/2011 |
| WO | 2011023732 A2 | 3/2011 |
| WO | 2011059067 A1 | 5/2011 |
| WO | 2011074025 A1 | 6/2011 |

OTHER PUBLICATIONS

Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. OH Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
ISR for PCT/IL07/01064 dated Mar. 25, 2008.
IPRP for PCT/IB2007/004584 dated Jun. 10, 2009, with Written Opinion.
IPRP for PCT/IB2007/004591 dated Jul. 13, 2010, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), dated Sep. 16, 2011.
UK Intellectual Property Office, Patents Act 1977: Patents Rules Notification of Grant: Patent Serial No. GB2480015, dated Nov. 29, 2011.
Walker, et al. "PV String Per-Module Maximum Power Point Enabling Converters", School of Information Technology and Electrical Engineering The University of Queensland, Sep. 28, 2003.
Walker, "Cascaded DC-DC Converter Connection of Photovoltaic Modules", 33rd Annual IEEE Power Electronics Specialists Con-

(56) References Cited

OTHER PUBLICATIONS ference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
IPRP for PCT/IL2007/001064 dated Mar. 17, 2009, with Written Opinion dated Mar. 25, 2008.
IPRP for PCT/IB2007/004586 dated Jun. 10, 2009, with Written Opinion.
Gao, et al., "Parallel-Connected Solar Pv System to Address Partial and Rapidly Fluctuating Shadow Conditions", IEEE Transactions on Industrial Electronics, vol. 56, No. 5, May 2009, pp. 1548-1556.
IPRP PCT/IB2007/004610—dated Jun. 10, 2009.
Extended European Search Report—EP12176089.6—dated Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 ( May 13, 1996), pp. 1429-1432, XP010208423.
Extended European Search Report—EP12177067.1—dated Dec. 7, 2012.
GB Combined Search and Examination Report—GB1200423.0— dated Apr. 30, 2012.
GB Combined Search and Examination Report—GB1201499.9— dated May 28, 2012.
GB Combined Search and Examination Report—GB1201506.1— dated May 22, 2012.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", José Rodríguez et al., IEEE Transactions on Industrial Electronics, vol. 49, No. 4, Aug. 2002.
Extended European Search Report—EP 08878650.4—dated Mar. 28, 2013.
Satcon Solstice—Satcon Solstice 100 kW System Solution Sheet— 2010.
John Xue, "PV Module Series String Balancing Converters", University of Queensland—School of Information Technology & Electrical Engineering, Nov. 6, 2002.
Robert W. Erickson, "Future of Power Electronics for Photovoltaics", IEEE Applied Power Electronics Conference, Feb. 2009.
Extended European Search Report—EP 18000890.6—dated Mar. 7, 2019.

Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Conference, Feb. 2001, Colorado Power Electronics Center Publications.
Chen, et al., "Buck-Boost PWM Converters Having Two Independently Controlled Switches", IEEE Power Electronics Specialists Conference, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "Photovoltaic DC-DC Module Integrated Converter for Novel Cascaded and Bypass Grid Connection Topologies— Design and Optimisation", 37th IEEE Power Electronics Specialists Conference, Jun. 18-22, 2006, Jeju, Korea.
Geoffrey R. Walker Affidavit re: U.S. Appl. No. 11/950,307, submitted in an IDS for U.S. Appl. No. 11/950,271 on Mar. 9, 2010.
Geoffrey R. Walker Affidavit re: U.S. Appl. No. 11/950,271, submitted in an IDS for U.S. Appl. No. 11/950,271 on Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.

(56) References Cited

OTHER PUBLICATIONS

Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Oct. 3-7, 1999—Matsui, et al., "A New Maximum Photovoltaic Power Tracking Control Scheme Based on Power Equilibrium at DC Link", IEEE, 1999, pp. 804-809.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009135358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18(3), dated Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
SANDIA Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.
United Kingdom Intellectual Property Office, Combined Search and Examination Report Under Sections 17 and 18(3), GB1020862.7, dated Jun. 16, 2011.
GB Combined Search and Examination Report—GB1203763.6—dated Jun. 25, 2012.

Mohammad Reza Amini et al., "Quasi Resonant DC Link Inverter with a Simple Auxiliary Circuit", Journal of Power Electronics, vol. 11, No. 1, Jan. 2011.
Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, The Hong Kong Polytechnic University, Hung Hom, Hong Kong, Power Electronics Conference, 1998, PESC 98.
1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al.,"A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC Converters for Photovoltaic Power System", IEEE 1998.
Tore Skjellnes et al., "Load sharing for parallel inverters without communication", Nordic Workshop in Power and Industrial Electronics, Aug. 12-14, 2002.
Giorgio Spiazzi at el., "A New Family of Zero-Current-Switching Variable Frequency dc-dc Converters", IEEE 2000.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids—state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / 12 a Sep. 16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—dated Mar. 26, 2013.
Supplementary European Search Report—EP08857456—dated Dec. 6, 2013.
Extended European Search Report—EP14151651.8—dated Feb. 25, 2014.
Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved

(56) References Cited

OTHER PUBLICATIONS from the Internet: URL:http:jscholar.lib.vt.edu/theses/available/etd-012299-165108/unrestricted/THESIS. PDF, [retrieved on Mar. 5, 2013].

Yoshida M et al: "Actual efficiency and electromagnetic noises evaluations of a single inductor resonant AC link snubber-assisted three-phase soft-switching inverter", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.

Third party observation—EP07874025.5—dated Aug. 6, 2011.

Extended European Search Report—EP Appl. 13793995.5—dated Nov. 16, 2015.

Chinese Office Action—CN Appl. 201380039237.4—dated Aug. 19, 2016.

Aug. 14, 2019—Notice of Opposition of European Patent 3168971—Huawei Technologies Co., Ltd.

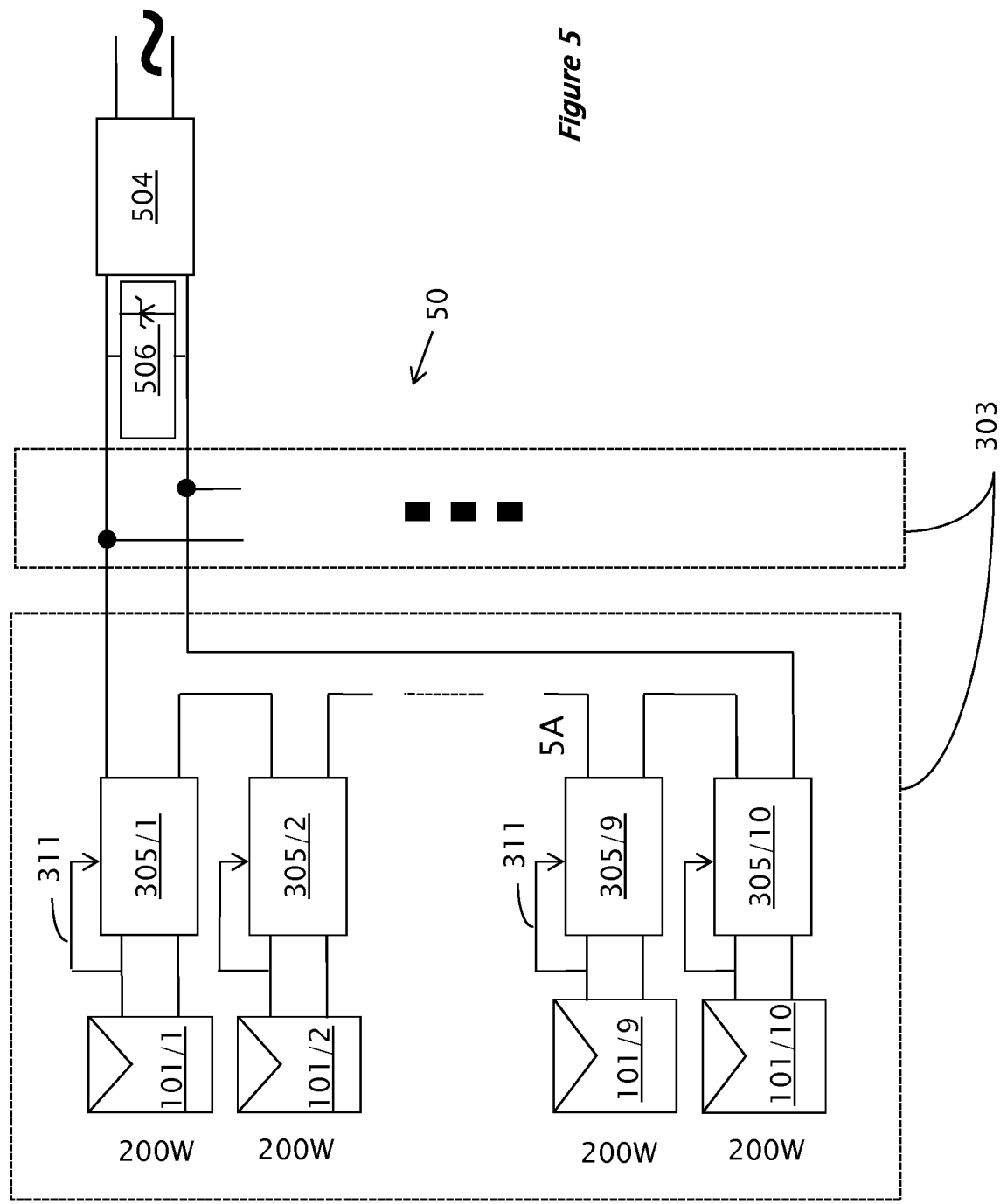

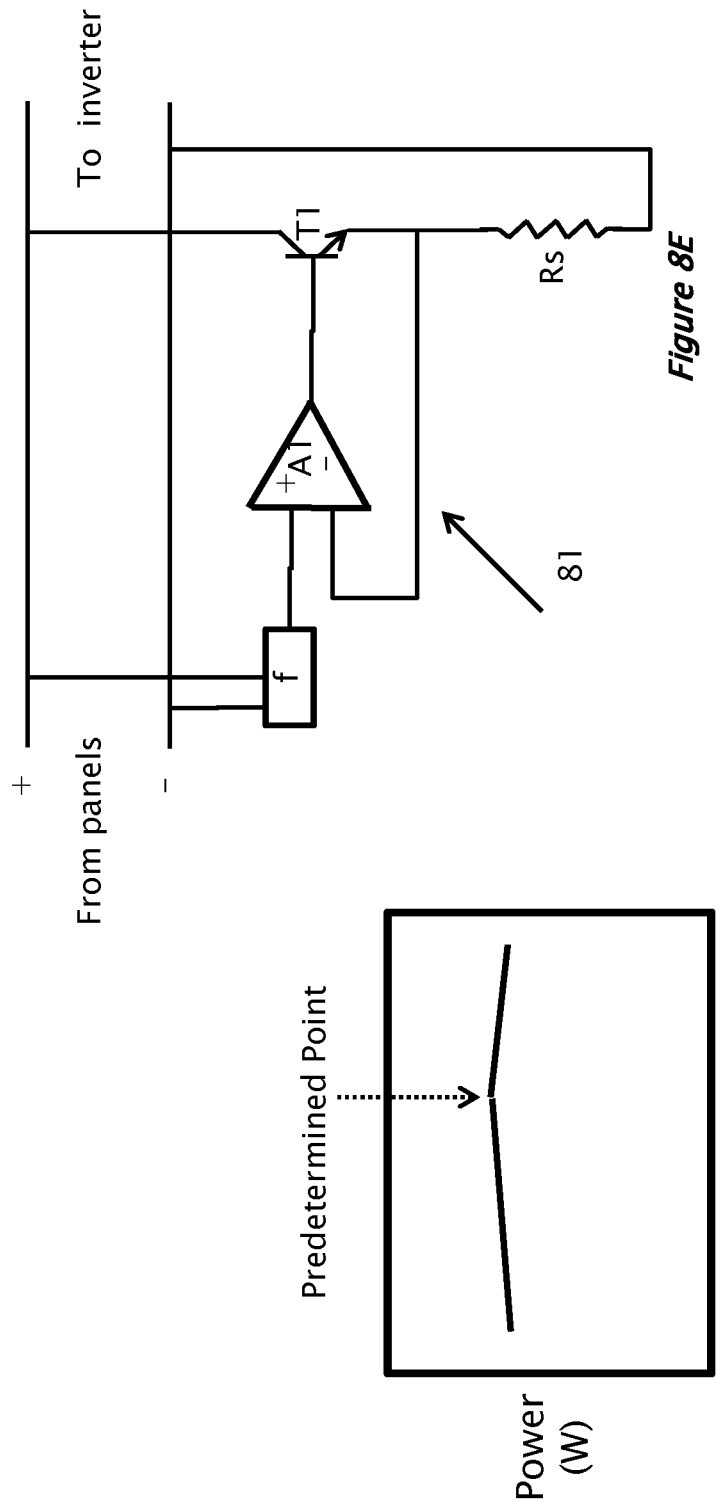

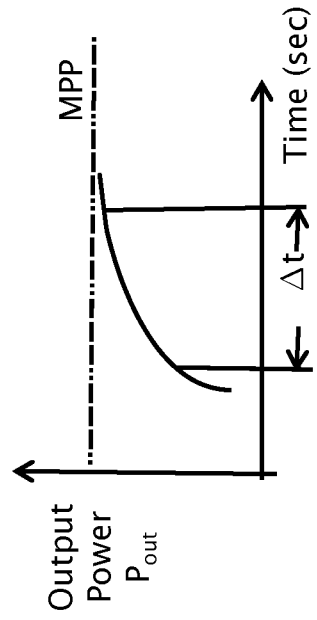
*Figure 9B*
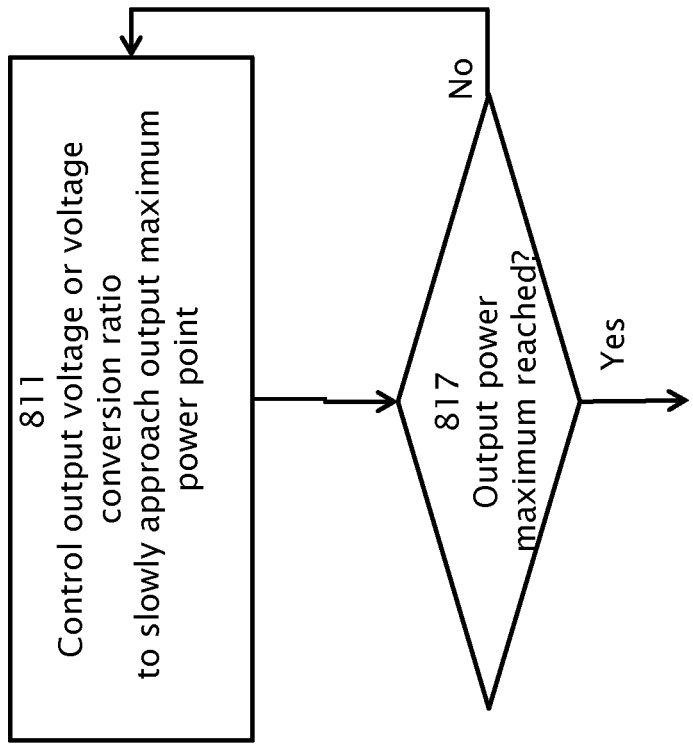
*Figure 9C*
*Figure 9A*

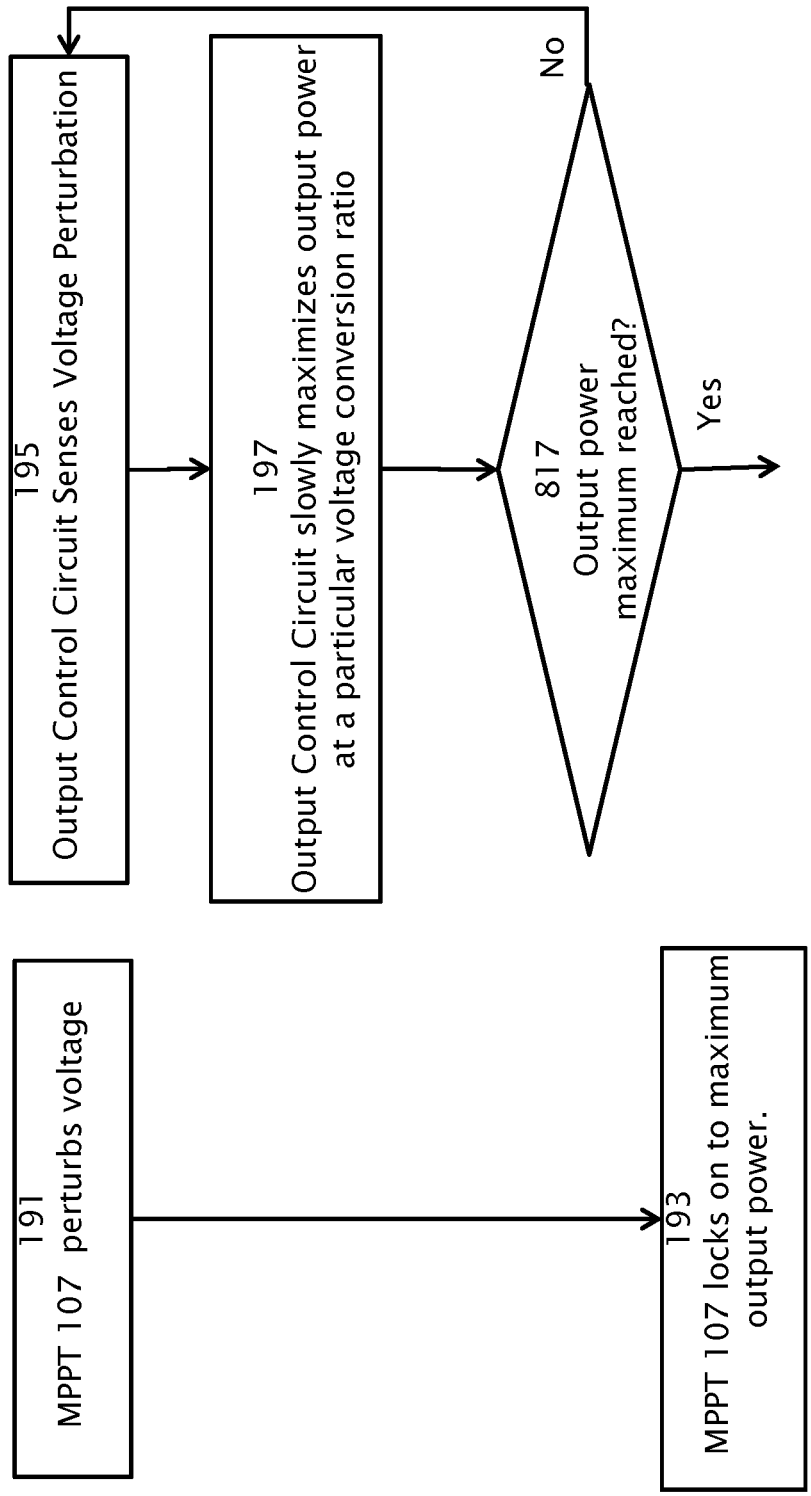

CIRCUIT FOR INTERCONNECTED DIRECT CURRENT POWER SOURCES

BACKGROUND

Embodiments described in this application relate generally to control of power production from distributed current sources such as direct current (DC) power sources.

Recent interest in renewable energy has led to increased research in systems for distributed generation of energy, such as photovoltaic cells (PV), fuel cells and batteries. Various inconsistencies in manufacturing may cause two otherwise identical sources to provide different output characteristics. Similarly, two such sources may react differently to operating conditions, e.g. load and/or environmental conditions, e.g. temperature. In installations, different sources may also experience different environmental conditions, e.g., in solar power installations some panels may be exposed to full sun, while others may be shaded, thereby delivering different power output. In a multiple battery installation, some of the batteries may age differently, thereby delivering different power output.

BRIEF SUMMARY

Various embodiments relate to power conversion in a distributed energy system that may have some of characteristics described above. While the various embodiments may be applicable to any distributed power system, the following discussion turns to solar energy so as to provide a better understanding by way of example without limitation to other applications.

Distributed power systems are described, including a power converter circuit for a direct current (DC) power source such as one or more photovoltaic panels, photovoltaic substrings or photovoltaic cells. A load, e.g. grid-tied inverter, may be connected by DC power lines to receive the harvested power from one or more of the power converter circuits. According to an aspect, the power converter circuit may include a direct current to direct current (DC/DC) power converter configured to convert DC power received on a DC/DC power converter input from the photovoltaic panel(s) to a DC/DC power converter output. The circuit may include a control circuit, which is configured to sense input voltage and/or input current and to determine input power received on the DC/DC power converter input (output power from the photovoltaic panel). The control circuit may be configured to maximize the input power by operating the power source (e.g., photovoltaic panel) at a current and voltage that is tracked to maximize the power yield of the power source, or its maximum power point. Since the maximum power point tracking is performed at the input of the power converter, the output voltage or current of the power converter is not fully constrained. While the power output from the DC/DC converter is about equal to the input power from the photovoltaic power times the efficiency of the conversion, the voltage and current at the output of the DC/DC power converter may be set, determined and/or controlled by the load or by a control circuit at the input of the load. The load may be an inverter adapted to convert the DC power to alternating current (AC) at the frequency of the grid. According to an aspect, the inverter does not utilize a maximum power point tracking (MPPT) module since the maximum power from each DC source is already tracked individually for each panel by the control circuits. The inverter may have a control block at its input which sets the input voltage at a convenient value, optionally a predetermined value, and/or optionally a constant value, e.g. 400 Volts, for instance to maximize the efficiency of the load, e.g. inverter, or to minimize power loss in the DC lines.

However, many commercially available inverter modules already include integrated MPPT tracking circuits designed for use with conventional photovoltaic distributed power systems that do not include individual MPPT tracking for each power source as described above. It would be desirable that standard commercially available inverters with integrated MPPT modules be compatible with the DC/DC power converter circuits with the control circuits, which individually maximize power from the DC power sources, e.g. photovoltaic panels. However, since the control circuit maintains the photovoltaic panel at its maximum power point, the power output of the DC/DC converters may not present to the input of the inverter a power peak that can be tracked by the inverter's integrated MPPT as current or voltage at the output of the DC/DC converter varies. As a result, an MPPT module, if present at the inverter input may not be able to stabilize and lock onto any particular voltage that maximizes power at the input to the inverter. As a result, the MPPT module of the inverter is used in a system according to aspects may force the input to the inverter to an extreme voltage (or current), and/or become unstable and considerable power may be lost.

Thus, there is a need for and it would be advantageous to have power converter circuits which operate universally with all or most types of inverters whether equipped with an MPPT module or not and for a load equipped with a control block which sets input voltage to the load to a convenient optionally constant value as described above. Various methods, systems and/or devices are disclosed herein, which provide a power converter circuit including a power converter connectible to a direct current (DC) power source such as a photovoltaic panel. The direct current (DC) power source may include one or more photovoltaic solar cells or solar panels interconnected in series and/or in parallel. The power converter includes input terminals adapted for connecting to the direct current (DC) power source and output terminals. The power converter may be operative to convert input power received from the DC power source at the power converter input terminals to an output power at the power converter output terminals. The power converter may have a control circuit connected at the power converter input terminals so that during operation of the power converter, the control circuit sets the input voltage or the input current at the power converter input terminals to maximize the input power, e.g., to perform maximum power point tracking (MPPT). A maximum power point tracking circuit may also be connected to the power converter output terminals. The power converter may include multiple like power converter circuits series connected at their output terminals into serial strings. The serial strings may be parallel connected and input to the load via the maximum power point tracking circuit. The having load input terminals and load output terminals may be configured to receive power from the power converter, e.g., via the maximum power point tracking circuit connected to the power converter output terminals. The load may be an inverter or a DC/DC power converter.

According to different features:

A. The output voltage of the power converter may be sensed. The control circuit may be configured to set the input power received at the input terminals of the power converter to a maximum power only at a predetermined output voltage point or output voltage range or at a predetermined output current point or output current range. Away from the predetermined output voltage or predetermined output current, the control circuit may be configured to set the input power received at the input terminals to less than the maximum available power.

In this way, the maximum power point tracking circuit operatively connected to the output terminals of the power converter may stably track the predetermined voltage and/or current point or range.

B. The control circuit may be configured to set the input power received at the input terminals to the power converter to a maximum power. A power attenuator may be connected to the output terminals of the power converter. The power attenuator may be configured to attenuate power output at output voltages other than at a predetermined output voltage range (or a predetermined output current range) and not to attenuate output power at the predetermined output voltage or current point or range. The maximum power point tracking circuit may be connected to the attenuated power output. The maximum power point tracking circuit may be configured to lock onto the maximum power point at the predetermined output voltage range or at the predetermined output current range. The load may be typically configured for receiving power from the power converter via the power attenuator and via the maximum power point tracking circuit connected to the attenuated power output.

C. The control circuit may be configured to set the input power received at the input terminals of the power converter to the maximum power point of the power source. A control circuit connected to the input terminals is configured to vary the voltage conversion ratio defined as the ratio of input voltage to output voltage of the power converter. The voltage conversion ratio may be varied or perturbed to slowly approach maximum power on the output terminals. The term "slowly" as used herein is relative to the response time of the MPPT circuit associated with the load (e.g., at the output of the power converter). The conversion ratio may be selected to achieve maximum power. Since the output power from the power converter approaches slowly maximum power, the MPPT circuit associated with the load responds accordingly and locks onto the predetermined output voltage at maximum output power.

D. The maximum power point tracking circuit associated with the load during the course of its operation may perturb its voltage or current input (output to the power converter). The power converter may include a control circuit to set the input power received at the input terminals of the power converter to the maximum power point and a control circuit configured to sense output voltage. The conversion ratio of the power conversion is slowly varied by the control circuit to slowly approach the selected conversion ratio and the predetermined output voltage at the maximum power point.

E. The features of paragraphs C and D are not exclusive and may be used in combination. If a change in output voltage at the output of the power converter is sensed then the conversion ratio of the power conversion is slowly varied by the control circuit to slowly approach the selected conversion ratio and the predetermined output voltage. Otherwise if a substantial change in output voltage is not sensed, the control circuit is configured to vary the output voltage to slowly approach the desired conversion ratio while the MPPT circuit approaches the maximum power point

BRIEF DESCRIPTION OF THE DRAWINGS

The present disclosure is illustrated by way of example and not limited in the accompanying figures in which like reference numerals indicate similar elements and in which:

FIG. 5 illustrates a distributed power harvesting system, according to other embodiments, wherein the voltage at the input of the inverter is controlled;

FIG. 8D illustrates graphically power output as a function of current modified according to various embodiments;

FIG. 8E illustrates a circuit for modifying output power according to various embodiments;

FIG. 9A and FIG. 9B illustrate processes performed in parallel at the power source and at the maximum power point tracking circuit, respectively, according to various embodiments;

FIG. 9C illustrates graphically variation of power output from one or more photovoltaic modules as a function to time, according to various embodiments;

FIG. 10A and FIG. 10B illustrate processes performed in parallel at the photovoltaic module and maximum power point tracking circuit, respectively, according to various embodiments.

Figure 1:
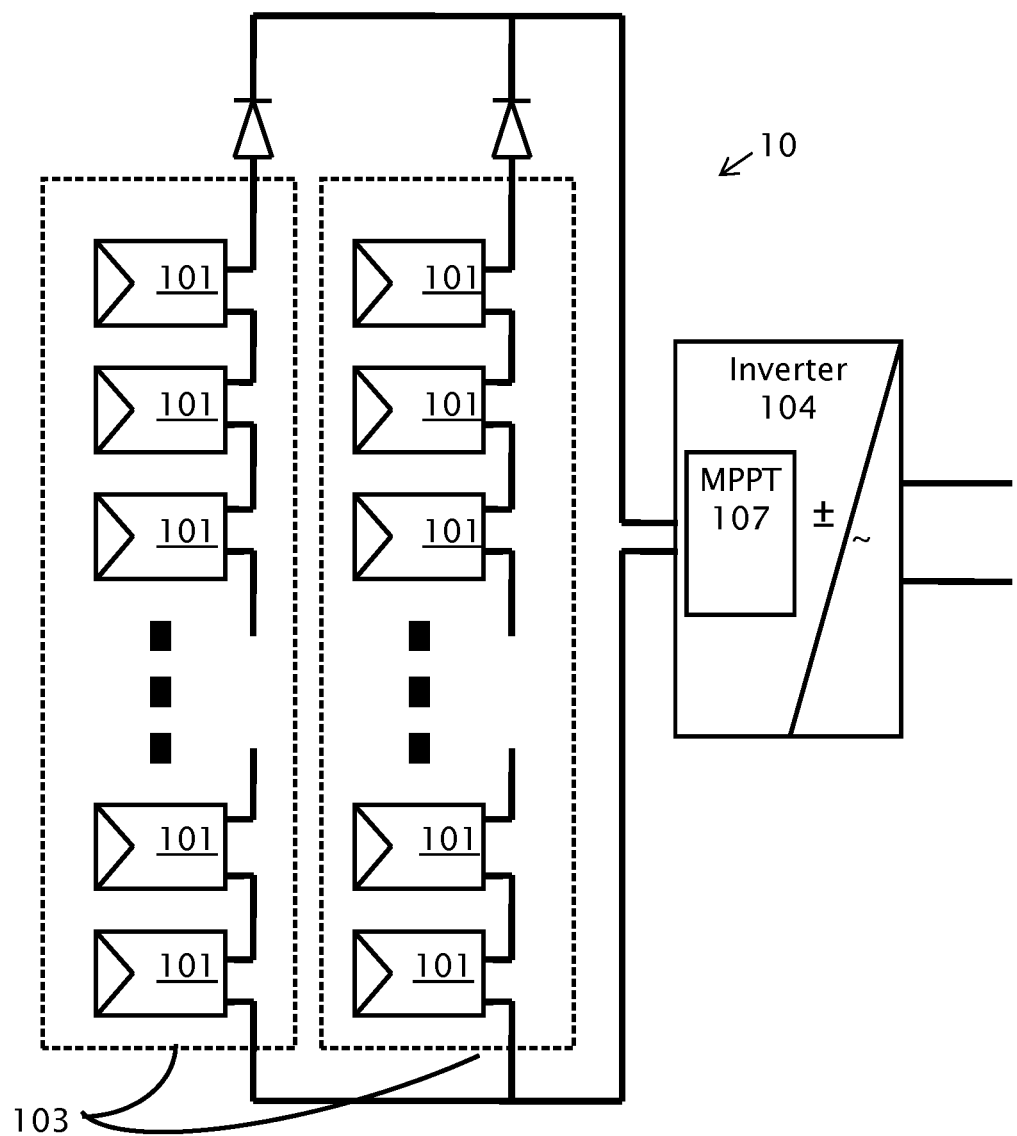
FIG. 1 illustrates a conventional centralized power harvesting system using DC power sources.

The foregoing and/or other aspects will become apparent from the following detailed description when considered in conjunction with the accompanying drawing figures.

DETAILED DESCRIPTION

Reference will now be made in detail to embodiments, examples of which are illustrated in the accompanying drawings, wherein like reference numerals refer to the like elements throughout. The embodiments are described below to explain examples by referring to the figures.

A conventional installation of solar power system 10 is illustrated in FIG. 1. Since the voltage provided by each individual solar panel 101 may be low, several panels may be connected in series to form a string of panels 103. For a large installation, when higher current may be utilized, several strings 103 may be connected in parallel to form the overall system 10. Solar panels 101 may be mounted outdoors, and their leads may be connected to a maximum power point tracking (MPPT) module 107 and then to an inverter 104. The MPPT 107 may be implemented as part of the inverter 104.

The harvested power from the DC sources may be delivered to the inverter 104, which converts the fluctuating direct-current (DC) into alternating-current (AC) having a desired voltage and frequency at the inverter output, which may be, e.g., I IOV or 220V at 60 Hz, or 220V at 50 Hz. In some examples, inverters that produce 220V may be then split into two I IOV feeds in an electric box. The AC current from the inverter 104 may then be used for operating electric appliances or fed to the power grid. Alternatively, if the installation is not tied to the grid, the power extracted from inverter 104 may be directed to a conversion and charge/discharge circuit to store the excess power created as charge in batteries. In case of a battery-tied application, the inversion stage might be skipped altogether, and the DC output of the MPPT stage 107 may be fed into the charge/discharge circuit.

As noted above, each solar panel 101 supplies relatively very low voltage and current. A challenge facing the solar array designer may be to produce a standard AC current at 120V or 220V root-mean-square (RMS) from a combination of the low voltages of the solar panels. The delivery of high power from a low voltage may utilize very high currents, which may cause large conduction losses on the order of the second power of the current (IQ). Furthermore, a power inverter, such as the inverter 104, which may be used to convert DC current to AC current, may be most efficient when its input voltage may be slightly higher than its output RMS voltage multiplied by the square root of 2. Hence, in many applications, the power sources, such as the solar panels 101, may be combined in order to reach the correct voltage or current. A common method may be to connect the power sources in series in order to reach the desirable voltage and in parallel in order to reach the desirable current, as shown in FIG. 1. A large number of the panels 101 may be connected into a string 103 and the strings 103 may be connected in parallel to the power inverter 104. The panels 101 may be connected in series in order to reach the minimal voltage for the inverter. Multiple strings 103 may be connected in parallel into an array to supply higher current, so as to enable higher power output.

While this configuration may be advantageous in terms of cost and architecture simplicity, several drawbacks have been identified for such architecture. One drawback may be inefficiencies caused by non-optimal power draw from each individual panel, as explained below. The output of the DC power sources may be influenced by many conditions. Therefore, to maximize the power draw from each source, one may need to draw the combination of voltage and current that provides the peak power for the currently prevailing conditions of the power source. As conditions change, the combination of voltage and current draw may need to be changed as well.

Figure 2:
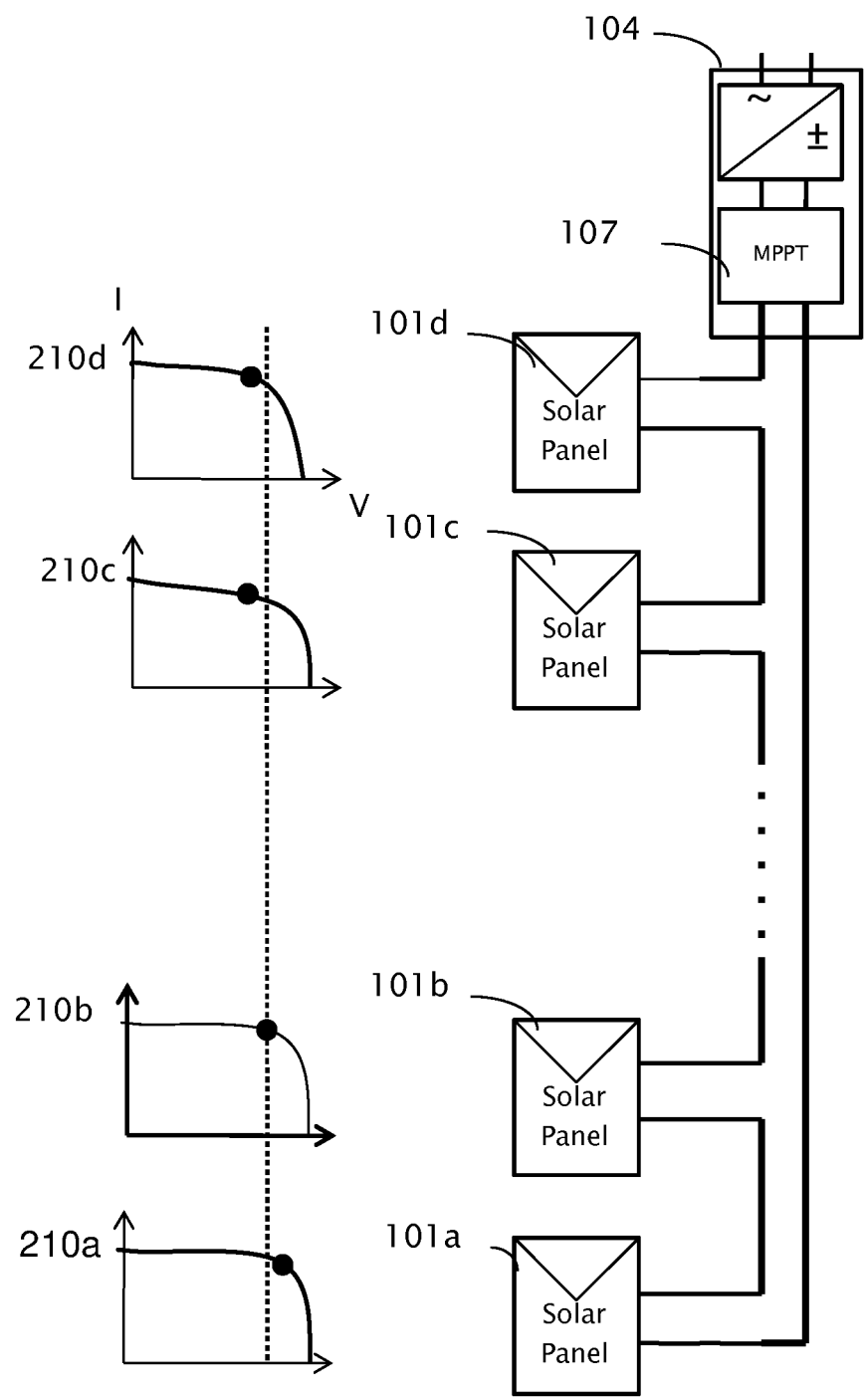
FIG. 2 illustrates current versus voltage characteristic curves for one serial string of DC sources.

FIG. 2 illustrates an example of one serial string of DC sources, e.g., solar panels 101a-101d, and MPPT circuit 107 integrated with inverter 104. The current versus voltage (IV) characteristics are plotted (210a-210d) to the left of each DC source 101. For each DC source 101, the current decreases as the output voltage increases. At some voltage value, the current goes to zero, and in some applications may assume a negative value, meaning that the source becomes a sink. Bypass diodes may be used to prevent the source from becoming a sink. The power output of each source 101, which may be equal to the product of current and voltage (P=I*V), varies depending on the voltage across the source. At a certain current and voltage, close to the falling off point of the current, the power reaches its maximum. It may be desirable to operate a power generating power source (e.g., photovoltaic panel, cell, etc.) at this maximum power point. The purpose of the MPPT may be to find this point and operate the system at this point to draw the maximum power from the sources.

In a typical, conventional solar panel array, different algorithms and techniques may be used to optimize the integrated power output of the system 10 using the MPPT module 107. The MPPT module 107 may receive the current extracted from all of the solar panels together and may track the maximum power point for this current to provide the maximum average power such that if more current is extracted, the average voltage from the panels starts to drop, thus lowering the harvested power. MPPT module 107 maintains a current that yields the maximum average power from the overall system 10. However, since sources 101a-101d may be connected in series to a single MPPT 107, the MPPT may select a single power point, which would be somewhat of an average of the maximum power points (MPP) of each of the serially connected sources. In practice, it may be very likely that the MPPT would operate at an I-V point that may be optimum to only a few or none of the sources. In the example of FIG. 2, each of the sources operate at the same current since the sources are connected in series, but the maximum power point for each source (indicated by a dot on curves 210a-210d) may be at different currents. Thus, the selected current operating point by MPPT 107 may be the maximum power point for source 101b, but may be off the maximum power point for sources 101a, 101c and 101d. Consequently, the arrangement may be not operated at best achievable efficiency.

Turning back to the example of system 10 of FIG. 1, fixing a predetermined constant output voltage from the strings 103 may cause solar panels 101 to supply lower output power than otherwise possible. Further, each string 103 carries a single current that is passed through all of solar panels 101 along string 103. If solar panels 101 are mismatched due to manufacturing differences, aging or if they malfunction or placed under different shading conditions, the current, voltage and power output of each panel may be different. Forcing a single current through all of panels 101 of string 103 may cause individual panels 101 to work at a non-optimal power point and can also cause panels 101, which may be highly mismatched to generate "hot spots" due to the high current flowing through them. Due to these and other drawbacks of conventional centralized methods of MPPT, panels 101 may be matched improperly. In some cases, external diodes may be used to bypass panels 101 that are highly mismatched. In conventional multiple string configurations all strings 103 may be composed of exactly the same number of solar panels and panels 101 may be selected of the same model and may be installed at exactly the same spatial orientation, being exposed to the same sunlight conditions at all times. Installation according to these constraints may be very costly. During installation of a solar array according to the conventional configurations 10, the installer can verify the correctness of the installation and performance of the solar array by using test equipment to check the current-voltage characteristics of each panel, each string and the entire array. In practice, however, individual panels and strings may be either not tested at all or tested only prior to connection. Current measurement may be performed by a series connection to the solar array such as with a series resistor in the array, which is typically not convenient. Instead, typically only high-level pass/fail testing of the overall installation is performed.

After the initial testing of the installation, the solar array may be connected to inverter 104, which may include a monitoring module, which monitors performance of the entire array. The performance information gathered from monitoring within inverter 104 may include integrated power output of the array and the power production rate, but the information lacks any fine details about the functioning of individual solar panels 101. Therefore, the performance information provided by monitoring at the inverter 104 may be insufficient to understand if power loss may be due to environmental conditions, from malfunctions or from poor installation or maintenance of the solar array. Furthermore, integrated information may not pinpoint which of solar panels 101 are responsible for a detected power loss.

Figure 3:
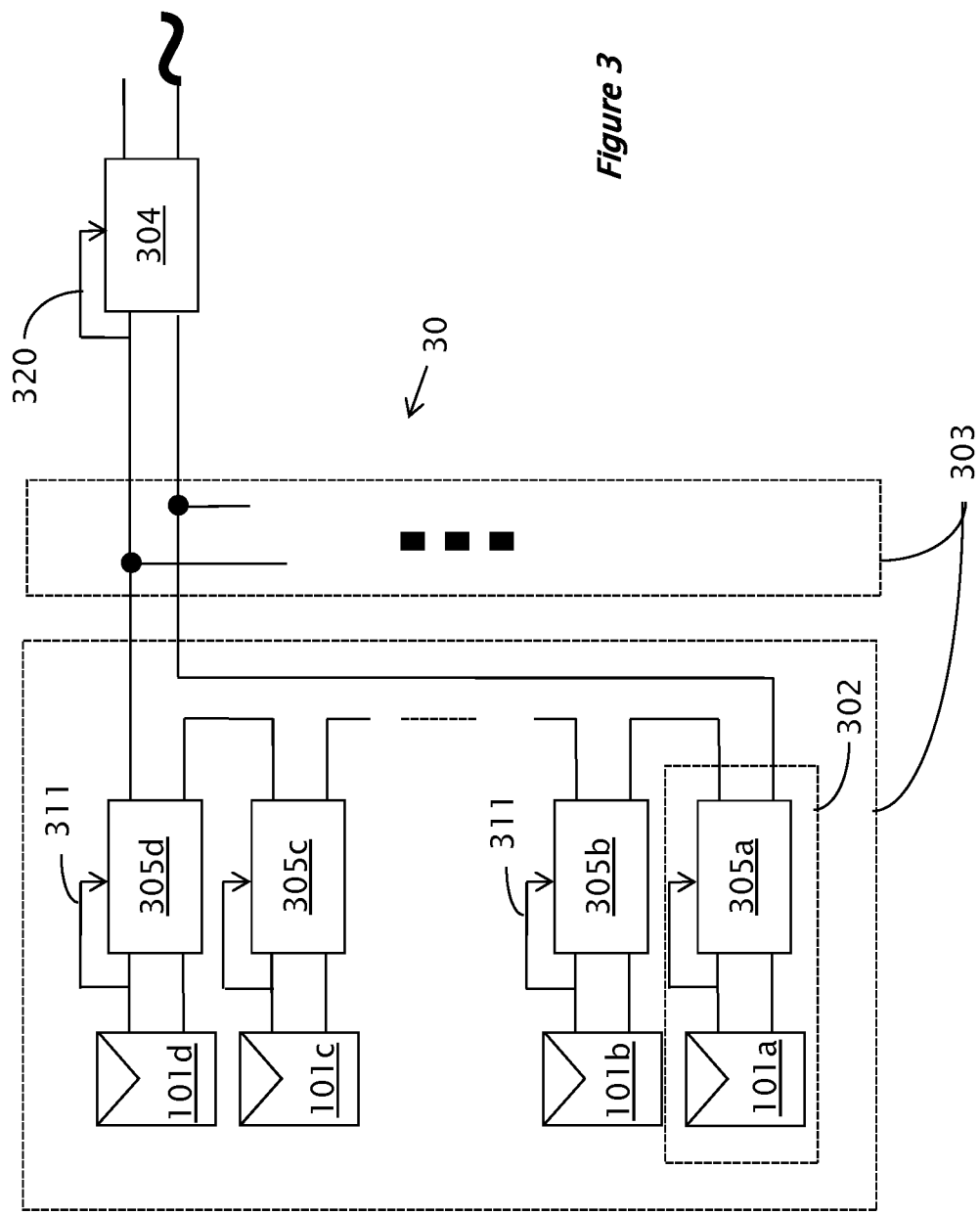
FIG. 3 illustrates a distributed power harvesting system, according to embodiments, using DC power sources.

FIG. 3 illustrates a distributed power harvesting configuration 30, according to an embodiment. Configuration 30 enables connection of multiple power sources, for example, solar panels 101a-101d, into a single power supply. In one aspect, the series string of all of the solar panels may be coupled to an inverter 304. In another aspect, several serially connected strings of solar panels may be connected to a single inverter 304. The inverter 304 may be replaced by other elements, such as, e.g., a charging regulator for charging a battery bank.

In configuration 30, each solar panel 101a-101d may be connected to a separate power converter circuit 305a-305d. One solar panel 101 together with its connected power converter circuit forms a module, e.g., photovoltaic module 302 (only one of which is labeled). Each converter 305a-305d adapts optimally to the power characteristics of the connected solar panel 101a-101d and transfers the power efficiently from converter input to converter output. The converters 305a-305d may be buck converters, boost converters, buck/boost converters, flyback or forward converters, etc. The converters 305a-305d may also contain a number of component converters, for example a serial connection of a buck and a boost converter.

Each converter 305a-305d may include a control circuit 311 that receives a feedback signal, not from the converter's output current or voltage, but rather from the converter's input coming from the solar panel 101. An input sensor measures an input parameter, input power, input current and/or input voltage and sets the input power. An example of such a control circuit may be a maximum power point tracking (MPPT) circuit. The MPPT circuit of the converter locks the input voltage and current from each solar panel I O1a-I O1d to its optimal power point. In the converters 305a-305d, according to aspects, a controller within converter 305 monitors the voltage and current at the converter input terminals and determines the pulse width modulation (PWM) of the converter in such a way that maximum power may be extracted from the attached panel 101a-101d. The controller of the converter 305 dynamically tracks the maximum power point at the converter input. In various aspects, the feedback loop of control circuit 311 may be closed on the input power in order to track maximum input power rather than closing the feedback loop on the output voltage as performed by conventional DC-to-DC voltage converters (e.g., MPPT 107). As a result of having a separate control circuit 311 in each converter 305a-305d, and consequently for each solar panel 101a-101d, each string 303 in system 30 may have a different number or different brand of panels 101a-101d connected in series. Control circuit 311 of FIG. 3 continuously maximizes power on the input of each solar panel 101a-101d to react to changes in temperature, solar radiance, shading or other performance factors that impact that particular solar panel 101a-I O1d. As a result, control circuit 311 within the converters 305a-305d harvests the maximum possible power from each panel 101a-101d and transfers this power as output power regardless of the parameters impacting the other solar panels.

As such, the embodiments shown in FIG. 3 continuously track and maintain the input current and the input voltage to each converter 305 at the maximum power point of the connected DC power source. The maximum power of the DC power source that may be input to converter 305 may be also output from converter 305. The converter output power may be at a current and voltage different from the converter input current and voltage. While maintaining the total power given the minor power loss due to inefficiency of the power conversion, the output current and output voltage from converter 305 may be responsive to requirements of the series connected portion of the circuit.

In one embodiment, the outputs of converters 305a-305d may be series connected into a single DC output that forms the input to the load, in this example, inverter 304. The inverter 304 converts the series connected DC output of the converters into an AC power supply. The load, in this case inverter 304, may regulate the voltage at the load's input using control circuit 320. That may be, in this example, an independent control loop 320 which may hold the input voltage at a predetermined set value, e.g. 400 volts. Consequently, input current of inverter 304 may be dictated by the available power, and this may be the current that flows through all serially connected DC sources. While the output of the DC-DC converters 305 are constrained by current and or voltage regulation at the input of inverter 304, the current and voltage input to power converter circuit 305 may be independently controlled using control circuit 311. Aspects provide a system and method for combining power from multiple DC power sources 101 into a distributed power supply. According to these aspects, each DC power source 101, e.g. photovoltaic panel 101 may be associated with a DC-DC power converter 305. Modules formed by coupling the DC power sources 101 to their associated converters 305 may be coupled in series to provide a string of modules. The string of modules may be then coupled to inverter 304 having its input voltage fixed. A maximum power point control circuit control circuit 311 in each converter 305 harvests the maximum power from each DC power source 101 and transfers this power as output from power converter 305. For each converter 305, the input power may be converted to the output power, such that the conversion efficiency may be 95°0 or higher in some situations.

Further, the controlling may be performed by fixing the input current or input voltage of the converter to the maximum power point and allowing output voltage of the converter to vary. For each power source 101, one or more sensors may monitor the input power level to the associated converter 305. In some embodiments, a microcontroller may perform the maximum power point tracking and control in each converter 305 by using pulse width modulation to adjust the duty cycle used for transferring power from the input to the output. An aspect may provide a greater degree of fault tolerance, maintenance and serviceability by monitoring, logging and/or communicating the performance of each solar panel. In various embodiments, the microcontroller that may be used for maximum power point tracking may also be used to perform the monitoring, logging and communication functions. These functions allow for quick and easy troubleshooting during installation, thereby significantly reducing installation time. These functions may be also beneficial for quick detection of problems during maintenance work. Aspects allow easy location, repair, or replacement of failed solar panels. When repair or replacement may be not feasible, bypass features provide increased reliability. In an aspect, arrays of solar cells are provided where the power from the cells may be combined. Each converter 305 may be attached to a single solar cell, or a plurality of cells connected in series, in parallel, or both, e.g., parallel connection of strings of serially connected cells.

In an embodiment, each converter 305 may be attached to one or more panels of a photovoltaic string. However, while applicable in the context of solar power technology, the aspects may be used in any distributed power network using DC power sources. For example, they may be used in batteries with numerous cells or hybrid vehicles with multiple fuel cells on board. The DC power sources may be solar cells, solar panels, electrical fuel cells, electrical batteries, and the like. Further, although the discussion below relates to combining power from an array of DC power sources into a source of AC voltage, the aspects may also apply to combining power from DC sources into another DC voltage.

In these DC-to-DC voltage converters, a controller within the converter may monitor the current or voltage at the input, and the voltage at the output. The controller may also determine the appropriate pulse width modulation (PWM) duty cycle to fix the output voltage to the predetermined value by increasing the duty cycle if the output voltage drops. Accordingly, the conventional converter may include a feedback loop that closes on the output voltage and uses the output voltage to further adjust and fine-tune the output voltage from the converter. As a result of changing the output voltage, the current extracted from the input may be also varied.

Figure 4A:
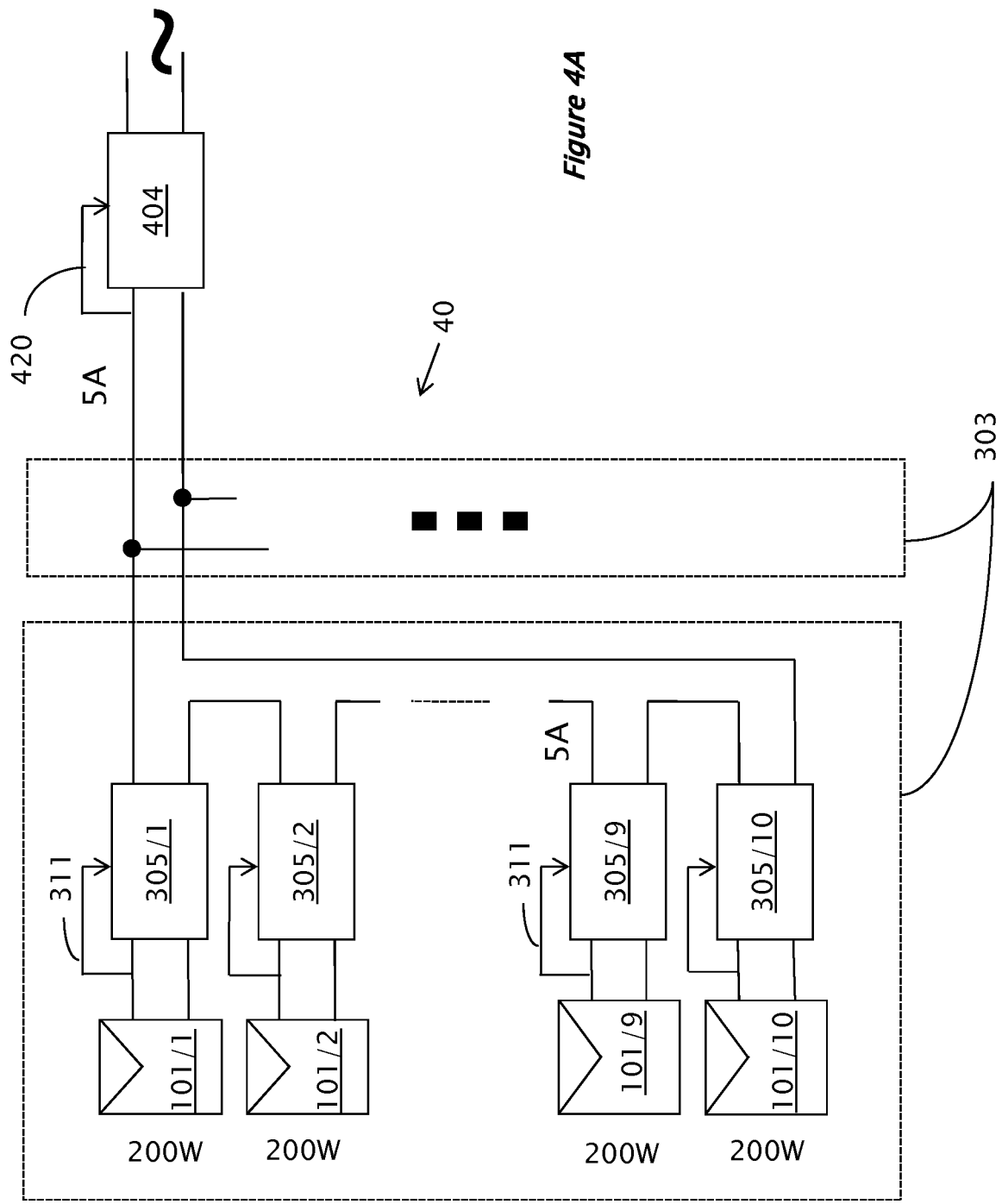
FIGS. 4A and 4B illustrate the operation of the system of FIG. 3 under different conditions, according to embodiments.
Figure 4B:
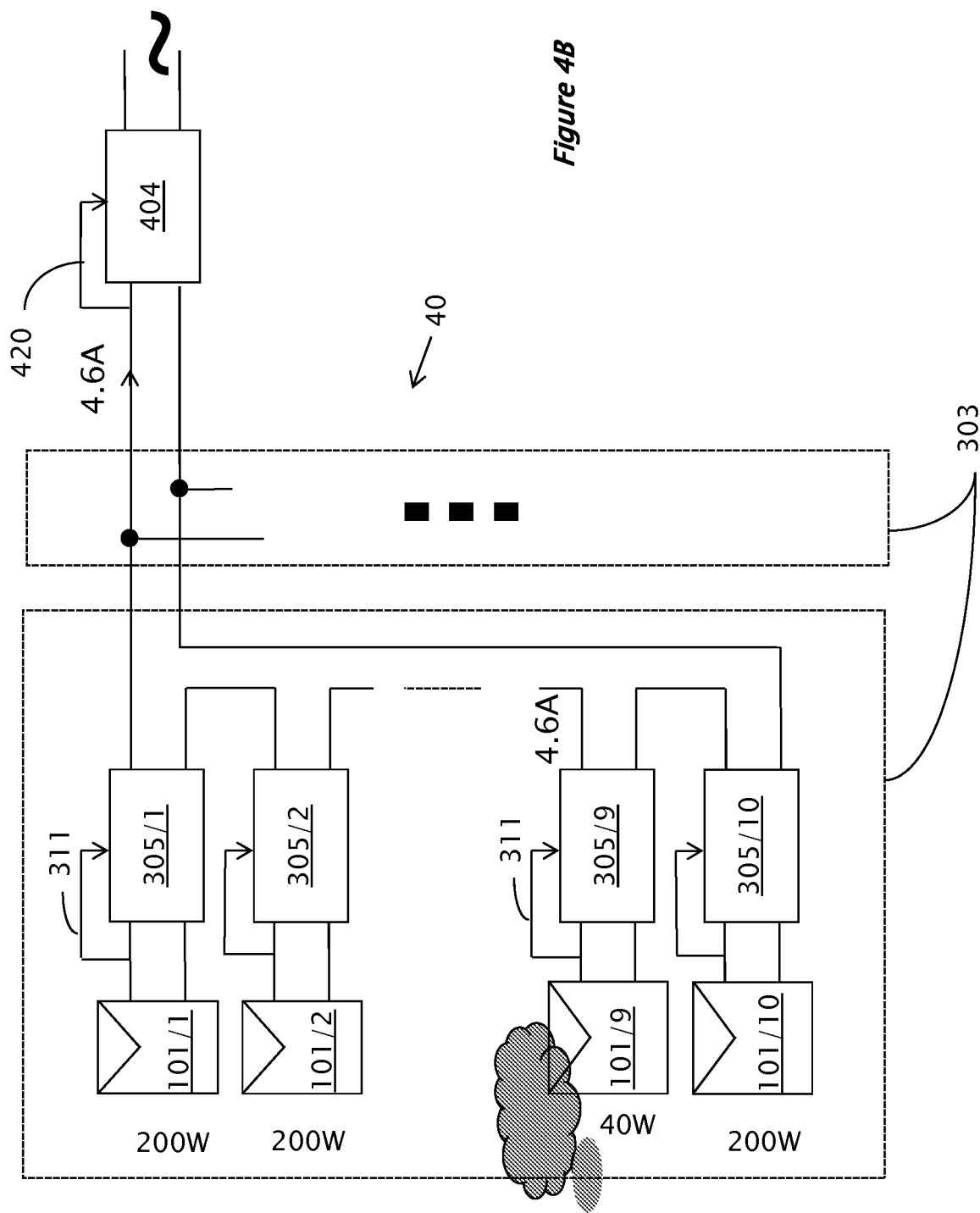

FIGS. 4A and 4B illustrate an operation of the system of FIG. 3 under different conditions, according to embodiments. An exemplary configuration 40 may be similar to configuration 30 of FIG. 3. In the example shown, ten DC power sources 101/I through 101/10 may be connected to ten power converters 305/I through 305/10, respectively. The modules formed by the DC power sources 101 and their connected converters 305 may be coupled together in series to form a string 303. In one embodiment, the series-connected converters 305 may be coupled to a DC-to-AC inverter 404.

DC power sources may be solar panels 101 and the example may be discussed with respect to solar panels as one illustrative case. Each solar panel 101 may have a different power output due to manufacturing tolerances, shading, or other factors. For the purpose of the present example, an ideal case may be illustrated in FIG. 4A, where efficiency of the DC-to-DC conversion may be assumed to be 100% and the panels 101 may be assumed to be identical. In some aspects, efficiencies of the converters may be quite high and range at about 95%-99%. So, the assumption of 100% efficiency may not be unreasonable for illustration purposes. Moreover, according to embodiments, each of the DC-DC converters 305 may be constructed as a power converter, i.e., it transfers to its output the entire power it receives in its input with very low losses. Power output of each solar panel 101 may be maintained at the maximum power point for the panel by a control loop 311 within the corresponding power converter 305. In the example shown in FIG. 4A, all of panels 101 may be exposed to full sun illumination and each solar panel 101 provides 200 W of power. Consequently, the MPPT loop may draw current and voltage level that will transfer the entire 200 W from the panel to its associated converter 305. That is, the current and voltage dictated by the MPPT form the input current I in and input voltage V in to the converter. The output voltage may be dictated by the constant voltage set at the inverter 404, as will be explained below. The output current Iout would then be the total power, i.e., 200 W, divided by the output voltage Vout.

Referring back to conventional system 10, FIGS. 1 and 2, the input voltage to load 104 varies according to the available power. For example, when a lot of sunshine may be available in a solar installation, the voltage input to inverter 104 can vary even up to 1000 volts. Consequently, as sunshine illumination varies, the voltage varies with it, and the electrical components in inverter 104 (or other power supplier or load) may be exposed to varying voltage. This tends to degrade the performance of the components and may ultimately cause them to fail. On the other hand, by fixing or limiting the voltage or current to the input of the load or power supplier, e.g., inverter 304, the electrical components may always be exposed to the same voltage or current and possibly have extended service life. For example, the components of the load (e.g., capacitors, switches and coil of the inverter) may be selected so that at the fixed input voltage or current they operate at, say, 60% of their rating. This may improve the reliability and prolong the service life of the component, which may be critical for avoiding loss of service in applications such as solar power systems.

As noted above, according to an embodiment, the input voltage to inverter 404 may be controlled by inverter 404 (in this example, kept constant), by way of control loop 420 (similar to control loop 320 of inverter 304 above). For the purpose of this example, assume the input voltage may be kept as 400V (ideal value for inverting to 220 VAC). Since it is assumed that there may be ten serially connected power converters, each providing 200 W, the input current to the inverter 404 is 2000 W/400V=5 A. Thus, the current flowing through each of the converters 101/I-101/10 may be 5 A. This means that in this idealized example each of converters 101 provides an output voltage of 200 W/5 A=40V. Now, assume that the MPPT for each panel 101 (assuming perfect matching panels) dictates that the maximum power point voltage for each panel is Vmpp 32V. This means that the input voltage to inverter 404 would be 32V, and the input current would be 200 W/32V=6.25 A.

We now turn to another example, where system 40 may be still maintained at an ideal mode (i.e., perfectly matching DC sources and entire power may be transferred to inverter 404), but the environmental conditions may different for different panels. For example, one DC source may be overheating, may be malfunctioning, or, as in the example of FIG. 4B, the ninth solar panel 101/9 may be shaded and consequently produces only 40 W of power. Since all other conditions as in the example of FIG. 4A are kept, the other nine solar panels 101 may be unshaded and still produce 200 W of power. The power converter 305/9 includes MPPT to maintain the solar panel 101/9 operating at the maximum power point, which may be now lowered due to the shading.

The total power available from the string may be now )×200 W+40 W=1840 W. Since the input to inverter 404 may be still maintained at 400V, the input current to inverter 404 will now be 1840 W/40V=4.6 A. This means that the output of all of the power converters 305/1-305/10 in the string may be at 4.6 A. Therefore, for the nine unshaded panels, the converters will output 200 W/4.6 A=43.5V. On the other hand, the converter 305/9 attached to the shaded panel 101/9 will output 40 W/4.6 A=8.7V. Checking the math, the input to inverter 404 can be obtained by adding nine converters providing 43.5 V and one converter providing 8.7V, i.e., (9×43.5V)+8.7V=400V.

The output of the nine non-shaded panels would still be controlled by the MPPT as in FIG. 4A, thereby standing at 32V and 6.25 A. On the other hand, since the ninth panel 101/9 is shaded, assume its MPP voltage dropped to 28V. Consequently, the output current of the ninth panel is 40 W/28V=1.43 A. As can be seen by this example, all of the panels may be operated at their maximum power point, regardless of operating conditions. As shown by the example of FIG. 4B, even if the output of one DC source drops dramatically, system 40 still maintains relatively high power output by fixing the voltage input to the inverter, and controlling the input to the converters independently so as to draw power from each DC source at the MPP.

As can be appreciated, the benefit of the topology illustrated in FIGS. 4A and 4B may be numerous. For example, the output characteristics of the serially connected DC sources, such as solar panels, need not match. Consequently, the serial string may utilize panels from different manufacturers or panels installed on different parts of the roofs (i.e., at different spatial orientation). Moreover, if several strings are connected in parallel, it may not be necessary that the strings match; rather each string may have different panels or different number of panels. This topology may also enhance reliability by alleviating the hot spot problem. As shown in FIG. 4B, the output of the shaded panel 101/9 is 1.43 A, while the current at the output of the unshaded panels is 6.25 A. This discrepancy in current when the components are series connected may cause a large current being forced through the shaded panel that may cause overheating and malfunction at this component. However, by the exemplary aspects of the topology shown, the input voltage may be set independently, and the power draw from each panel to its converter may be set independently according to the panel's MPP at each point in time, the current at each panel may be independent on the current draw from the serially connected converters.

It may be easily realized that since the power may be optimized independently for each panel, panels may be installed in different facets and directions in building-integrated photovoltaic (BIPV) installations. Thus, the problem of low power utilization in building integrated installations may be solved, and more installations may now be profitable. The described system may also easily solve the problem of energy harvesting in low light conditions. Even small amounts of light may be enough to make the converters 305 operational, and they then start transferring power to the inverter. If small amounts of power are available, there may be a low current flow—but the voltage will be high enough for the inverter to function, and the power may indeed be harvested. According to embodiments, inverter 404 may include a control loop 420 to maintain an optimal voltage at the input of inverter 404. In the example of FIG. 4B, the input voltage to inverter 404 may be maintained at 400V by the control loop 420. The converters 305 may be transferring substantially all (e.g., >95%) of the available power from the solar panels to the input of the inverter 404. As a result, the input current to the inverter 404 may be dependent only on the power provided by the solar panels and the regulated set, i.e., constant, voltage at the inverter input.

Figure 4C:
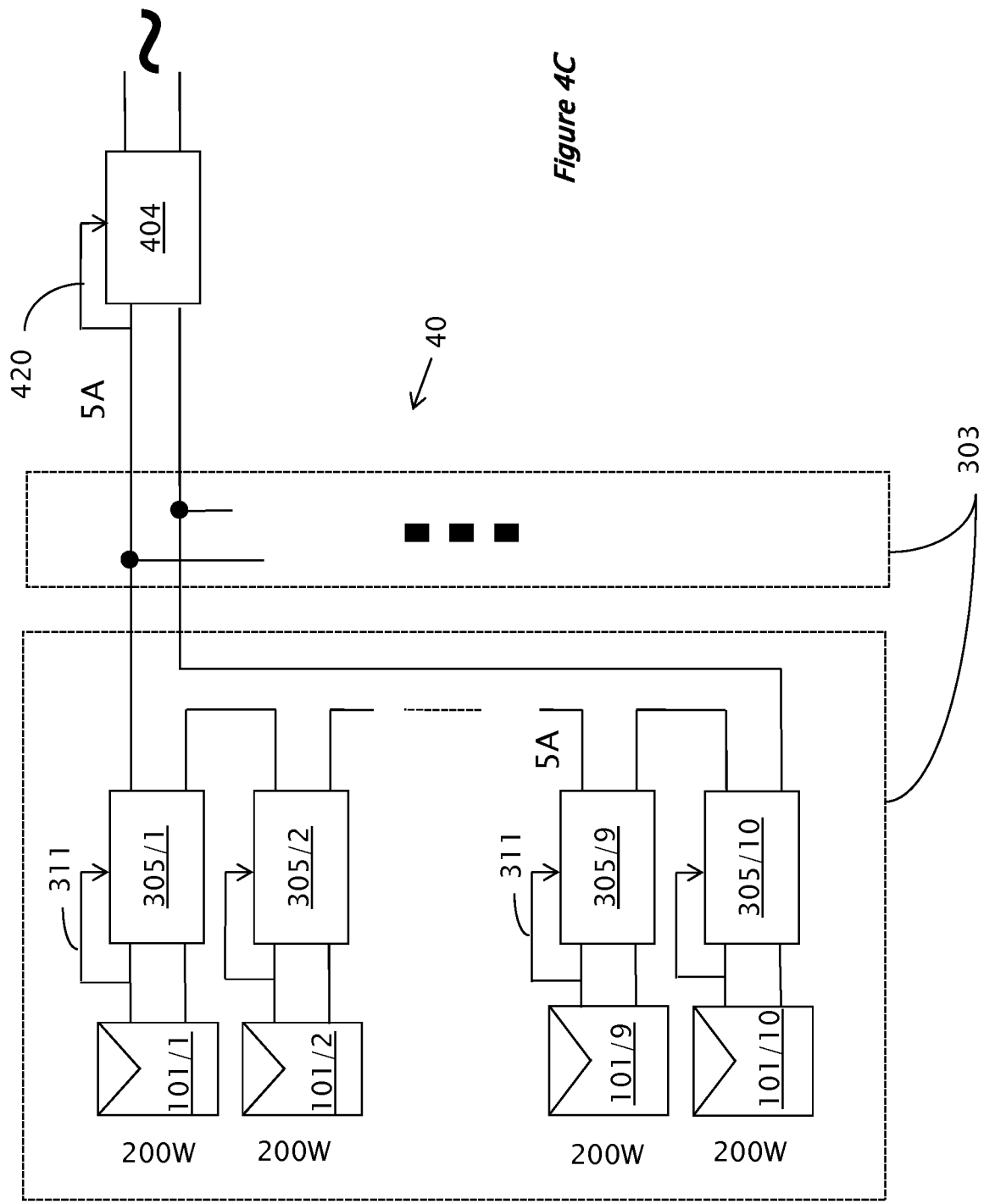
FIG. 4C illustrates a distributed power harvesting system, according to embodiments, wherein the inverter controls the input current.

Conventional inverter 104, shown in FIGS. 1 and FIG. 2, may have a very wide input voltage to accommodate for changing conditions, for example a change in luminance, temperature and aging of the solar array. This may be in contrast to inverter 404 that may be designed according to aspects. The inverter 404 does not utilize a wide input voltage and may be therefore simpler to design and more reliable. This higher reliability may be achieved, among other factors, by the fact that there may be no voltage spikes at the input to the inverter and thus the components of the inverter experience lower electrical stress and may last longer. When the inverter 404 may be a part of a circuit, the power from the panels may be transferred to a load that may be connected to the inverter. To enable the inverter 404 to work at its optimal input voltage, any excess power produced by the solar array, and not used by the load, may be dissipated. Excess power may be handled by selling the excess power to the utility company if such an option is available. For off-grid solar arrays, the excess power may be stored in batteries. Yet another option may be to connect a number of adjacent houses together to form a micro-grid and to allow load-balancing of power between the houses. If the excess power available from the solar array is not stored or sold, then another mechanism may be provided to dissipate excess power. The features and benefits explained with respect to FIGS. 4A and 4B stem, at least partially, from having inverter 404 control the voltage provided at its input. Conversely, a design may be implemented, where inverter 404 controls the current at its input. Such an arrangement may be illustrated in FIG. 4C. FIG. 4C illustrates an embodiment where the inverter controls the input current. Power output of each solar panel 101 may be maintained at the maximum power point for the panel by a control loop within the corresponding power converter 305. In the example shown in FIG. 4C, all of the panels may be exposed to full sun illumination and each solar panel 101 provides 200 W of power.

Consequently, the MPPT loop will draw current and voltage level that will transfer the entire 200 W from the panel to its associated converter. That is, the current and voltage controlled by the MPPT form the input current Iin and input voltage Vin to the converter. The output voltage of the converter may be determined by the constant current set at the inverter 404, as will be explained below. The output voltage Vout would then be the total power, i.e., 200 W, divided by the output current Iout. As noted above, according to an embodiment, the input current to inverter 404 may be controlled by the inverter by way of control loop 420. For the purpose of this example, assume the input current is kept as 5 A. Since it is assumed that there may be ten serially connected power converters, each providing 200 W, the input voltage to the inverter 404 is 2000 W/5 A=400V. Thus, the current flowing through each of the converters 101/I-101/10 may be 5 A. This means that in this idealized example each of the converters provides an output voltage of 200 W/5 A=40V. Now, assume that the MPPT for each panel (assuming perfect matching panels) controls the MPP voltage of the panel to Vmpp=32V. This means that the input voltage to the inverter would be 32V, and the input current would be 200 W/32V=6.25 A.

Consequently, similar advantages have been achieved by having inverter 404 control the current, rather than the voltage. However, unlike conventional art, changes in the output of the panels may not cause changes in the current flowing to the inverter, as that may be set by the inverter itself. Therefore, inverter 404 may be designed to keep the current or the voltage constant, then regardless of the operation of the panels, the current or voltage to inverter 404 will remain constant.

FIG. 5 illustrates a distributed power harvesting system 50, according to other embodiments, using DC power sources. FIG. 5 illustrates multiple strings 303 coupled together in parallel. Each of strings 303 may be a series connection of multiple modules and each of the modules includes a DC power source 101 that may be coupled to a converter 305. The DC power source may be a solar panel. The output of the parallel connection of the strings 303 may be connected, again in parallel, to a shunt regulator 506 and a load 504. The load 504 may be an inverter as with the embodiments of FIGS. 4A and 4B. Shunt regulators automatically maintain a constant voltage across its terminals. The shunt regulator 506 may be configured to dissipate excess power to maintain the input voltage at the input to the inverter 504 at a regulated level and prevent the inverter input voltage from increasing. The current which flows through shunt regulator 506 complements the current drawn by inverter 504 in order to ensure that the input voltage of the inverter may be maintained at a constant level, for example at 400V.

By fixing the inverter input voltage, the inverter input current may be varied according to the available power draw. This current may be divided between the strings 303 of the series connected converters. When each converter 305 includes a control loop 311 maintaining the converter input voltage at the maximum power point of the associated DC power source, the output power of converter 305 may be determined. The converter power and the converter output current together may determine the converter output voltage. The converter output voltage may be used by a power conversion circuit in the converter for stepping up or stepping down the converter input voltage to obtain the converter output voltage from the input voltage as determined by the MPPT.

Figure 6:
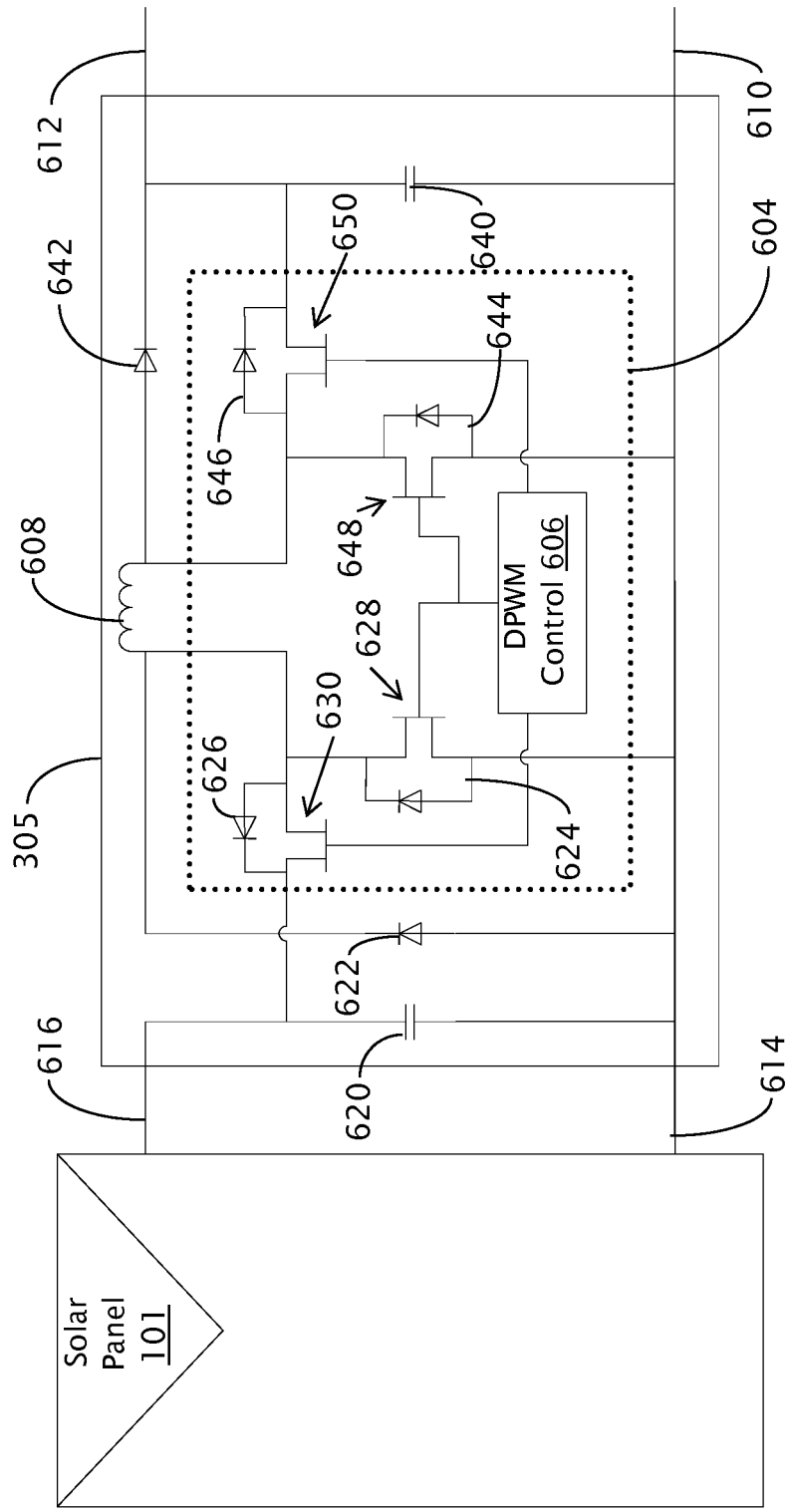
FIG. 6 illustrates an exemplary DC-to-DC converter according to embodiments.

FIG. 6 illustrates an illustrative example of DC-to-DC converter 305 according to embodiments. DC-to-DC converters may be conventionally used to either step down or step up a varied or constant DC voltage input to a higher or a lower constant voltage output, depending on the requirements of the circuit. However, in the embodiment of FIG. 6 the DC-DC converter may be used as a power converter, i.e., transferring the input power to output power, the input voltage varying according to the maximum power point, while the output current being dictated by the constant input voltage to inverter 304, 404, or 504. That is, the input voltage and current may vary at any time and the output voltage and current may vary at any time, depending on the operating condition of the DC power sources. The converter 305 may be connected to a corresponding DC power source 101 (or 101) at input terminals 614 and 616. The converted power of the DC power source 101 may be output to the circuit through output terminals 610 and 612. Between the input terminals 614 and 616 and the output terminals 610 and 612, the remainder of the converter circuit may be located that includes input and output capacitors 620 and 640, back flow prevention diodes 622 and 642 and a power conversion circuit including a controller 606 and an inductor 608.

The inputs 616 and 614 may be separated by a capacitor 620, which may act as an open circuit to a DC voltage. The outputs 610 and 612 may be also separated by a capacitor 640 that also acts as an open circuit to DC output voltage. These capacitors may be DC blocking or AC-coupling capacitors that short circuit when faced with alternating current of a frequency, which may be selectable. Capacitor 640 coupled between the outputs 610 and 612 may also operate as a part of the power conversion circuit discussed below. Diode 642 may be coupled between the outputs 610 and 612 with a polarity such that current may not backflow into the converter 305 from the positive lead of the output 612. Diode 622 may be coupled between the positive lead 612 through inductor 608, which acts as a short for DC current and the negative input lead 614 with such a polarity to prevent a current from the output 612 to backflow into the solar panel 101.

The DC power source 101 may be a solar panel, solar cell, string or solar panels or a string of solar cells. A voltage difference may exist between the wires 614 and 616 due to the electron-hole pairs produced in the solar cells of panel 101. Converter 305 may maintain maximum power output by extracting current from the solar panel 101 at its peak power point by continuously monitoring the current and voltage provided by the panel and using a maximum power point tracking algorithm. Controller 606 may include an MPPT circuit or algorithm for performing the peak power tracking. Peak power tracking and pulse width modulation, PWM, may be performed together to achieve the desired input voltage and current. The MPPT in the controller 606 may be any conventional MPPT, such as, e.g., perturb and observe (P&O), incremental conductance, etc. However, notably, the MPPT may be performed on the panel directly, i.e., at the input to the converter, rather than at the output of the converter. The generated power may be then transferred to the output terminals 610 and 612. The outputs of multiple converters 305 may be connected in series, such that the positive lead 612 of one converter 305 may be connected to the negative lead 610 of the next converter 305 (e.g., as shown in FIG. 4a).

In FIG. 6, the converter 305 may be shown as a buck plus boost converter. The term "buck plus boost" as used herein may be a buck converter directly followed by a boost converter as shown in FIG. 6, which may also appear in the literature as "cascaded buck-boost converter". If the voltage is to be lowered, the boost portion may be shorted (e.g., FET switch 650 statically closed). If the voltage is to be raised, the buck portion may be shorted (i.e., FET switch 630 statically closed). The term "buck plus boost" differs from buck/boost topology, which may be a classic topology that may be used when voltage is to be raised or lowered. The efficiency of "buck/boost" topology may be inherently lower than a buck plus boost converter. Additionally, for given requirements, a buck/boost converter may need bigger passive components than a buck plus boost converter in order to function. Therefore, the buck plus boost topology of FIG. 6 may have a higher efficiency than the buck/boost topology. However, the circuit of FIG. 6 may have to continuously decide whether it may be bucking (operating the buck portion) or boosting (operating the boost portion). In some situations when the desired output voltage may be similar to the input voltage, then both the buck and boost portions may be operational.

The controller 606 may include a pulse width modulator, PWM, or a digital pulse width modulator, DPWM, to be used with the buck and boost converter circuits. The controller 606 controls both the buck converter and the boost converter and determines whether a buck or a boost operation is to be performed. In some circumstances both the buck and boost portions may operate together. That is, as explained with respect to the embodiments of FIGS. 4A and 4B, the input voltage and input current may be selected independently of the selection of output current and output voltage. Moreover, the selection of either input or output values may change at any given moment depending on the operation of the DC power sources. Therefore, in the embodiment of FIG. 6 the converter may be constructed so that at any given time a selected value of input voltage and input current may be up converted or down converted depending on the output requirement. In one implementation, an integrated circuit (IC) 604 may be used that incorporates some of the functionality of converter 305. IC 604 may be a single ASIC able to withstand harsh temperature extremes present in outdoor solar installations. ASIC 604 may be designed for a high mean time between failures (MTBF) of more than 25 years. However, a discrete solution using multiple integrated circuits may also be used in a similar manner. In the exemplary embodiment shown in FIG. 6, the buck plus boost portion of the converter 305 may be implemented as the IC 604. Practical considerations may lead to other segmentations of the system. For example, in one embodiment, the IC 604 may include two ICs, one analog IC, which handles the high currents and voltages in the system, and one simple low-voltage digital IC, which includes the control logic. The analog IC may be implemented using power FETs that may alternatively be implemented in discrete components, FET drivers, A/Ds, and the like. The digital IC may form the controller 606.

In the exemplary circuit shown, the buck converter includes the input capacitor 620, transistors 628 and 630, a diode 622 positioned in parallel to transistor 628, and an inductor 608. The transistors 628 and 630 may each have a parasitic body diode 624 and 626, respectively. In the exemplary circuit shown, the boost converter includes the inductor 608, which may be shared with the buck converter, transistors 648 and 650, a diode 642 positioned in parallel to transistor 650, and the output capacitor 640. The transistors 648 and 650 may each have a parasitic body diode 644 and 646, respectively.

Figure 7:
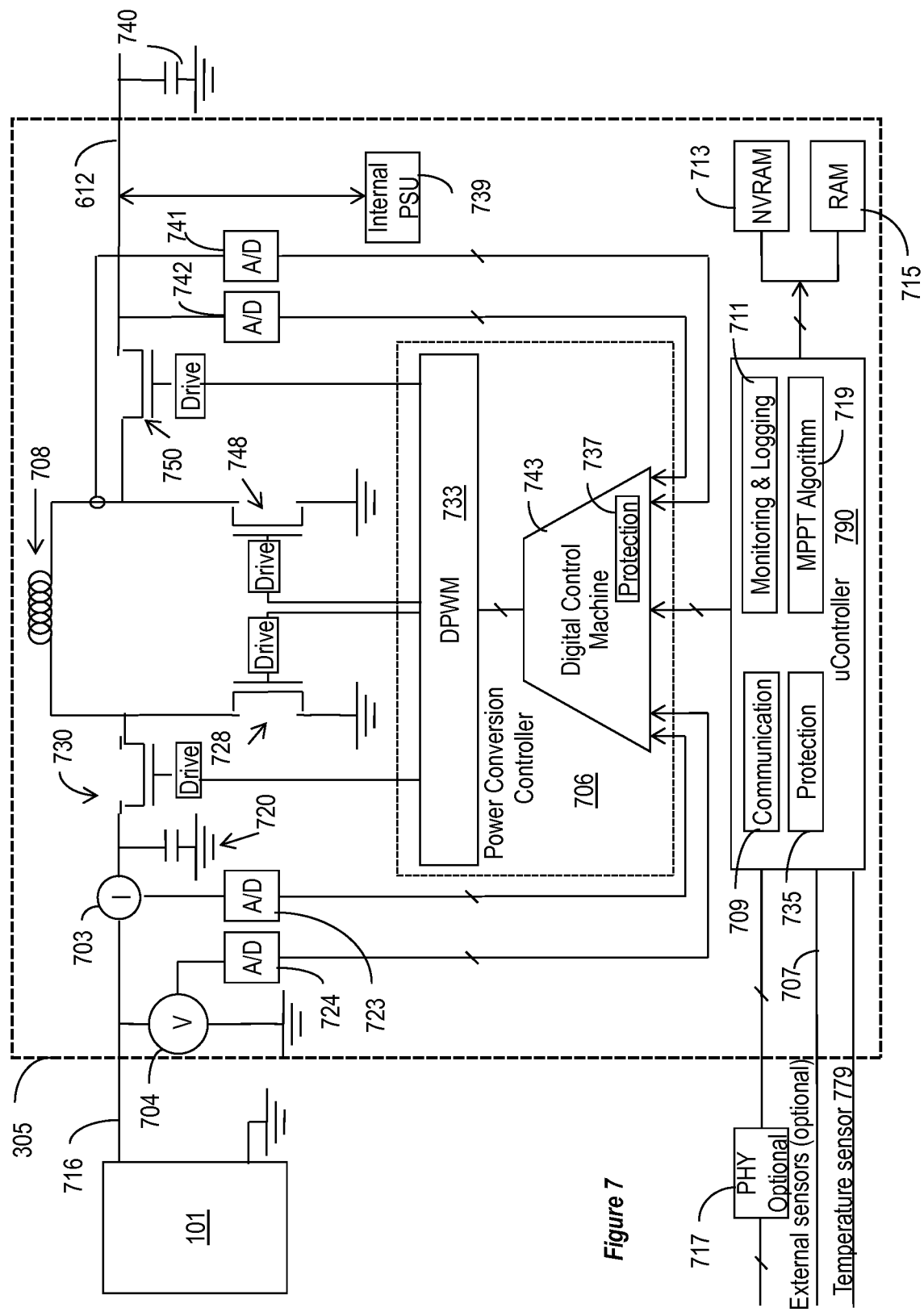
FIG. 7 illustrates a power converter including control features according to various embodiments.

FIG. 7 illustrates another illustrative embodiment of a power converter 305, according to embodiments. FIG. 7 highlights, among others, a monitoring and control functionality of a DC-to-DC converter 305, according to embodiments. A DC voltage source 101 is also shown in the figure. DC-to-DC converter 305 is connected to DC voltage source 101 through input 716, and connected to output capacitor 740 through output 612. Portions of a simplified buck and boost converter circuit are shown for converter 305. The portions shown include the switching transistors 728, 730, 748 and 750 and the common inductor 708. Each of the switching transistors may be controlled by a power conversion controller 706.

The power conversion controller 706 includes the pulse-width modulation (PWM) circuit 733, and a digital control machine 743 including a protection portion 737. The power conversion controller 706 may be coupled to microcontroller 790, which includes an MPPT algorithm 719, and may also include a communication module 709, a monitoring and logging module 711, and a protection module 735.

A current sensor 703 may be coupled between the DC power source 101 and the converter 305, and output of the current sensor 703 may be provided to the digital control machine 743 through an associated analog to digital converter 723. A voltage sensor 704 may be coupled between the DC power source 101 and the converter 305 and output of the voltage sensor 704 may be provided to the digital control machine 743 through an associated analog to digital converter 724. The current sensor 703 and the voltage sensor 704 may be used to monitor current and voltage output from the DC power source, e.g., the solar panel 101. The measured current and voltage may be provided to the digital control machine 743 and may be used to maintain the converter input power at the maximum power point.

The PWM circuit 733 controls the switching transistors of the buck and boost portions of the converter circuit. The PWM circuit may be a digital pulse-width modulation (DPWM) circuit. Outputs of the converter 305 taken at the inductor 708 and at the switching transistor 750 may be provided to the digital control machine 743 through analog to digital converters 741, 742, so as to control the PWM circuit 733.

A random access memory (RAM) module 715 and a non-volatile random access memory (NVRAM) module 713 may be located outside the microcontroller 790 but coupled to the microcontroller 790. A temperature sensor 779 and one or more external sensor interfaces 707 may be coupled to the microcontroller 790. The temperature sensor 779 may be used to measure the temperature of the DC power source 101. A physical interface 717 may be coupled to the microcontroller 790 and used to convert data from the microcontroller into a standard communication protocol and physical layer. An internal power supply unit 739 may be included in the converter 305.

In various embodiments, the current sensor 703 may be implemented by various techniques used to measure current. In one embodiment, the current measurement module 703 may be implemented using a very low value resistor. The voltage across the resistor will be proportional to the current flowing through the resistor. In another embodiment, the current measurement module 703 may be implemented using current probes, which use the Hall Effect to measure the current through a conductor without adding a series resistor. After translating the current measurement to a voltage signal, the data may be passed through a low pass filter and then digitized. The analog to digital converter associated with the current sensor 703 may be shown as the A/D converter 723 in FIG. 7. Aliasing effect in the resulting digital data may be avoided by selecting an appropriate resolution and sample rate for the analog to digital converter. If the current sensing technique does not utilize a series connection, then the current sensor 703 may be connected to the DC power source 101 in parallel.

In one embodiment, the voltage sensor 704 uses simple parallel voltage measurement techniques in order to measure the voltage output of the solar panel. The analog voltage may be passed through a low pass filter in order to minimize aliasing. The data may be then digitized using an analog to digital converter. The analog to digital converter associated with the voltage sensor 704 may be shown as the A/D converter 724 in FIG. 7. The A/D converter 724 has sufficient resolution to generate an adequately sampled digital signal from the analog voltage measured at the DC power source 101 that may be a solar panel.

The current and voltage data collected for tracking the maximum power point at the converter input may be used for monitoring purposes also. An analog to digital converter with sufficient resolution may correctly evaluate the panel voltage and current. However, to evaluate the state of the panel, even low sample rates may be sufficient. A low-pass filter makes it possible for low sample rates to be sufficient for evaluating the state of the panel. The current and voltage data may be provided to the monitoring and logging module 711 for analysis.

Temperature sensor 779 enables the system to use temperature data in the analysis process. The temperature may be indicative of some types of failures and problems. Furthermore, in the case that the power source may be a solar panel, the panel temperature may be a factor in power output production.

The one or more optional external sensor interfaces 707 enable connecting various external sensors to the converter 305. External sensors 707 may be used to enhance analysis of the state of the solar panel 101, or a string or an array formed by connecting the solar panels 101. Examples of external sensors 707 include ambient temperature sensors, solar radiance sensors, and sensors from neighboring panels. External sensors may be integrated into the converter 305 instead of being attached externally. In one embodiment, the information acquired from the current and voltage sensors 703, 704 and the optional temperature and external sensors 707 may be transmitted to a central analysis station for monitoring, control, and analysis using the communications interface 709. The central analysis station is not shown in the figure.

The communication interface 709 connects a microcontroller 790 to a communication bus. The communication bus can be implemented in several ways. In one embodiment, the communication bus may be implemented using an off-the-shelf communication bus such as Ethernet or RS422. Other methods such as wireless communications or power line communications, which could be implemented on the power line connecting the panels, may also be used. If bidirectional communication is used, the central analysis station may request the data collected by the microcontroller 790. Alternatively or in addition, the information acquired from sensors 703, 704, 707 may be logged locally using the monitoring and logging module 711 in local memory such as the RAM 715 or the NVRAM 713.

Analysis of the information from sensors 703, 704, 707 enables detection and location of many types of failures associated with power loss in solar arrays. Smart analysis can also be used to suggest corrective measures such as cleaning or replacing a specific portion of the solar array. Analysis of sensor information can also detect power losses caused by environmental conditions or installation mistakes and prevent costly and difficult solar array testing.

Consequently, in one embodiment, the microcontroller 790 simultaneously maintains the maximum power point of input power to the converter 305 from the attached DC power source or solar panel 101 based on the MPPT algorithm in the MPPT module 719, and manages the process of gathering the information from sensors 703, 704, 707. The collected information may be stored in the local memory 713, 715 and transmitted to an external central analysis station. In one embodiment, the microcontroller 790 may use previously defined parameters stored in the NVRAM 713 in order to operate converter 305. The information stored in the NVRAM 713 may include information about the converter 305 such as serial number, the type of communication bus used, the status update rate and the ID of the central analysis station. This information may be added to the parameters collected by the sensors before transmission.

Converters 305 may be installed during the installation of the solar array or retrofitted to existing installations. In both cases, converters 305 may be connected to a panel junction connection box or to cables connecting the panels 101. Each converter 305 may be provided with the connectors and cabling to enable easy installation and connection to solar panels 101 and panel cables.

In one embodiment, physical interface 717 may be used to convert to a standard communication protocol and physical layer so that during installation and maintenance, the converter 305 may be connected to one of various data terminals, such as a computer or PDA. Analysis may then be implemented as software, which will be run on a standard computer, an embedded platform or a proprietary device.

The installation process of converters 305 may include connecting each converter 305 to a solar panel 101. One or more of sensors 703, 704, 707 may be used to ensure that the solar panel 101 and the converter 305 may be properly coupled together. During installation, parameters such as serial number, physical location and the array connection topology may be stored in the NVRAM 713. These parameters may be used by analysis software to detect future problems in solar panels 101 and arrays.

When the DC power sources 101 are solar panels, one of the problems facing installers of photovoltaic solar panel arrays may be safety. The solar panels 101 may be connected in series during the day when there may be sunlight. Therefore, at the final stages of installation, when several solar panels 101 may be connected in series, the voltage across a string of panels may reach dangerous levels. Voltages as high as 600V may be common in domestic installations. Thus, the installer faces a danger of electrocution. The converters 305 that may be connected to the panels 101 may use built-in functionality to prevent such a danger. For example, the converters 305 may include circuitry or hardware of software safety module that limits the output voltage to a safe level until a predetermined minimum load may be detected. Only after detecting this predetermined load does the microcontroller 790 ramps up the output voltage from the converter 305. Another method of providing a safety mechanism may be to use communications between the converters 305 and the associated inverter for the string or array of panels. This communication, that may be for example a power line communication, may provide a handshake before any significant or potentially dangerous power level may be made available. Thus, the converters 305 would wait for an analog or digital release signal from the inverter in the associated array before transferring power to inverter. The above methodology for monitoring, control and analysis of the DC power sources 101 may be implemented on solar panels or on strings or arrays of solar panels or for other power sources such as batteries and fuel cells.

Figure 8B:
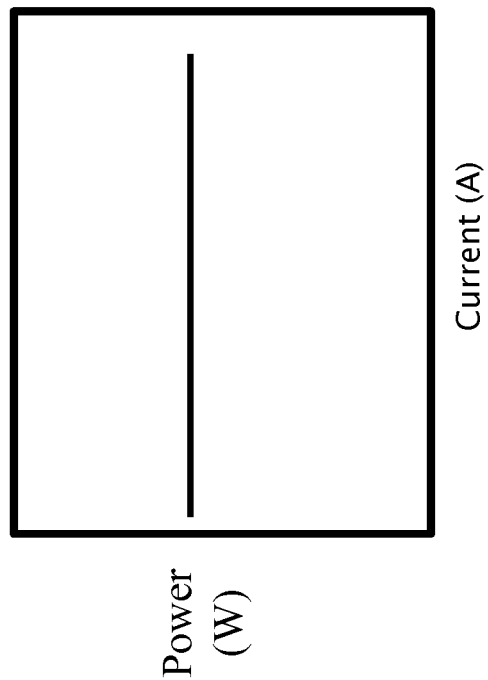
FIG. 8B illustrates graphically power input or output versus output current from one photovoltaic module or a system of series/parallel connected photovoltaic modules and/or strings.
Figure 8A:
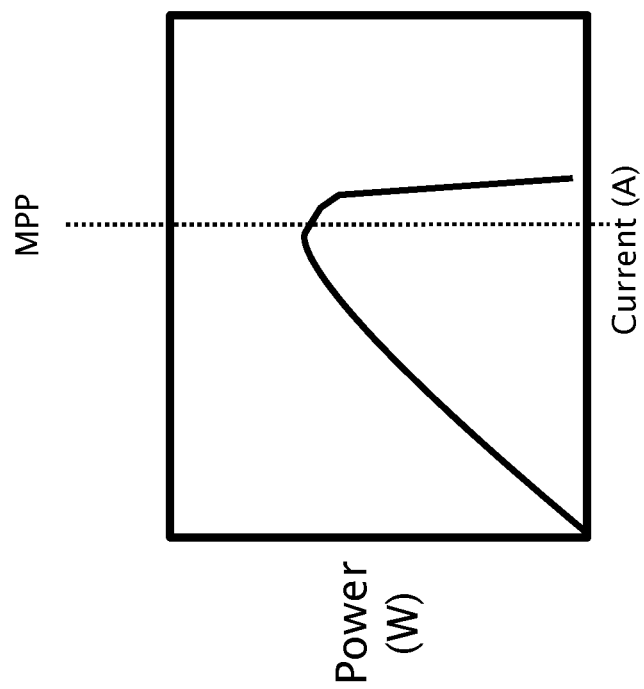
FIG. 8A illustrates graphically behavior of power output from solar panels as a function of output current in a conventional system.

Reference is now made to FIG. 8A, which illustrates graphically behavior of power output in FIG. 2 from solar panels 101 (and which is input to inverter module 104) as a function of current in conventional system 10. Power increases approximately linearly until a current at which a maximum power point MPP may be found which may be some average over the MPP points of all connected solar panels 101. Conventional MPPT module 107 locks (e.g., converges) on to the maximum power point.

Reference is now also made to FIG. 8B which illustrates graphically power input or power output versus output current from series/parallel connected modules 302 or strings 303 (FIG. 3). It may be readily seen that by virtue of control circuit 311 in modules 302, power as a function of current output may be approximately constant. Similarly, power as a function of voltage output may be approximately constant. It is desirable and it would be advantageous to have a system in which modules 302 and/or string 303 of FIG. 3 operate with the conventional inverter 104 equipped with an MPPT module 107 of FIG. 2. However, as shown in FIG. 8B, MPPT 107 does not have a maximum power peak (versus current or voltage) on which to lock on to and MPPT circuit 107 may become unstable with varying or oscillating current/voltage at the input of inverter module 104. In order to avoid this potential instability, according to a feature, a maximum power at an output voltage or current at least for a time period may be output or presented to conventional inverter module 104 equipped with MPPT module 107 according to various aspects.

Figure 8C:
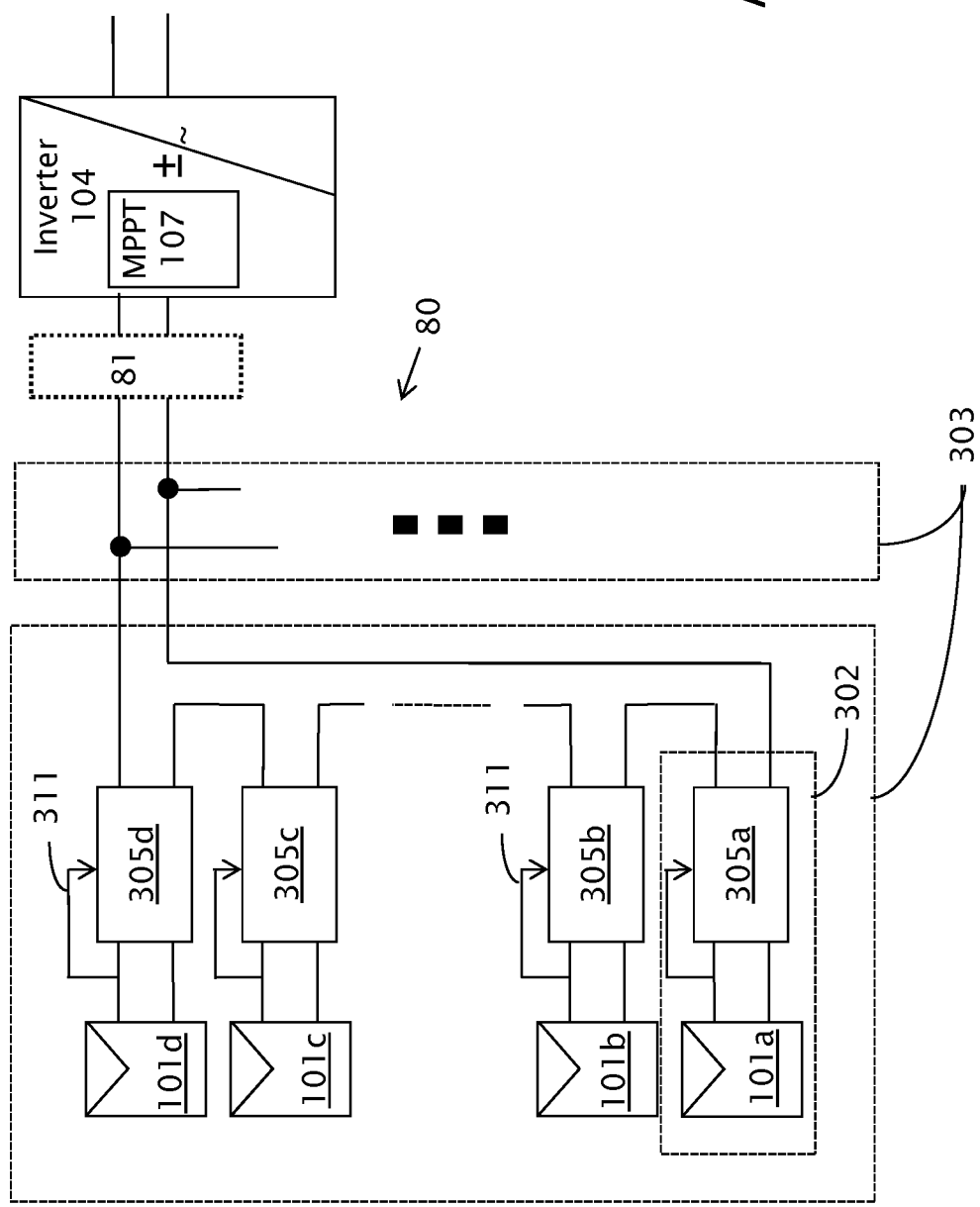
FIG. 8C illustrates in a block diagram of a distributed power harvesting system according to various embodiments.

Reference is now made to FIG. 8C which illustrates in a simplified block diagram of a photovoltaic distributed power harvesting system 80 including photovoltaic panels 101 a101d connected respectively to power converter circuits 305a-305d. Solar panel 101 together with its associated power converter circuit 305 forms photovoltaic module 302. Each converter 305a-305d adapts to the power characteristics of the connected solar panel 101 a-101d and transfers the power efficiently from converter input to converter output. Each converter 305a-305d includes control circuit 311 that receives a feedback signal from the input from solar panel 101. Control circuit 311 may be a maximum power point tracking (MPPT) control loop. The MPPT loop in converter 305 locks the input voltage and current from each solar panel 10 1a-101d to its optimal power point (i.e., to converge on the maximum power point).

System 80 includes a series and/or parallel connection between outputs of strings 303 and the input of a conventional inverter 104 with an integrated MPPT module 107. Inverter 104 with integrated MPPT module 107 is designed to be connected directly to the outputs with series/parallel connections of conventional solar panels 101 as in conventional system 10 of FIG. 1.

Referring back to FIG. 7, MPPT algorithm 719 of microcontroller 790 in converters 305 may, in various embodiments, provide a slight maximum input power at a predetermined output voltage or current or conversion ratio into MPPT 107. The input power into MPPT 107 may be maximized at a predetermined value of output voltage or current. In one embodiment, as shown in FIG. 8D, the maximum at the predetermined maximum power point may be very slight with a total variation of just a few percent to several percent over the entire input range of current or voltage of inverter 104. In other embodiments, a circuit, 81 disposed between panels 101 or strings 303 and inverter 104 may be used to present to MPPT module 107 with a maximum power point onto which to lock (e.g., converge).

Reference is now made to FIG. 8E which illustrates an embodiment of circuit 81 for generating a maximum power point at the input of MPPT module 107 in configuration 80 (FIG. 8), according to an embodiment. Circuit 81 may be a power attenuator interposed between parallel-connected strings 303 and MPPT module 107. Circuit 81 may include a non-linear current sink "f" configured to draw a small amount of current at a particular voltage or voltage range from the DC power line connecting strings 303 to MPPT module 107. The output of current sink "f" may be fed into the positive input of operational amplifier A1. The output of operational amplifier A1 feeds the base of transistor T1, the emitter of which may be connected and fed back to the negative input of operational amplifier A1. The collector of transistor T1 connects to the positive DC power line. The negative DC power line may be connected to the emitter of transistor T1 through a shunt resistor Rs.

Figures 8F, 8G:
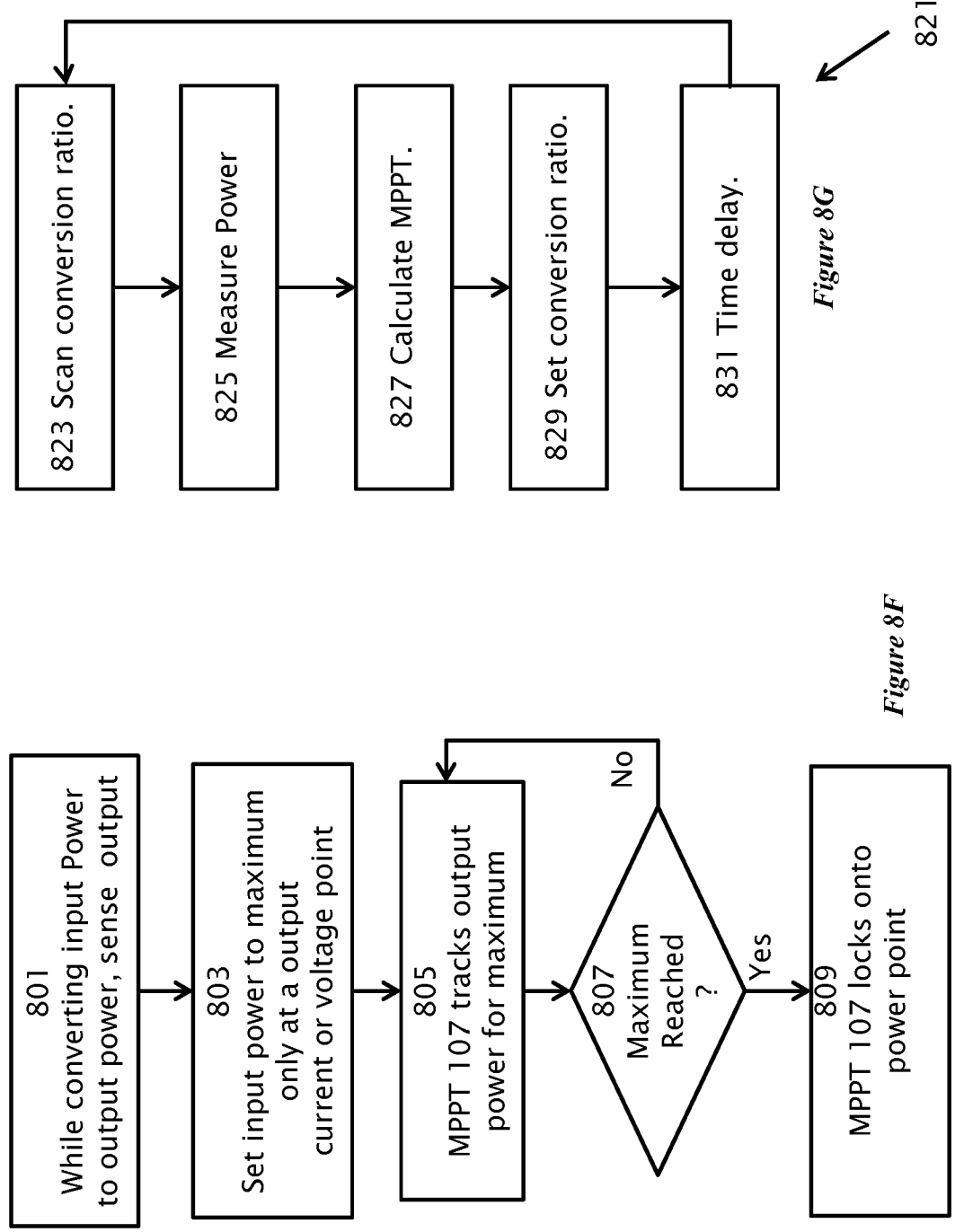
FIG. 8F illustrates a process of power conversion and tracking maximum power, according to various embodiments.
FIG. 8G which illustrates a process for operating an inverter equipped with an MPPT module according to various embodiments.

Reference is now made to FIG. 8F, which illustrates a simplified method for operating modules 302 and/or strings 303 with inverter 104 equipped with an MPPT module 107. Reference is also made again to FIGS. 6 and 7. The output voltage of power converter 305 is sensed (step 801) across output terminals 610 and 612. Control circuit 311 may be configured to set (step 803) the input power received at the input terminals 614/616 to a maximum power for a predetermined output voltage point or voltage range or at a predetermined output current point or current range. The predetermined values may be stored in memory 713 and/or 715 or may be received through communications interface 709. Away from the predetermined output voltage or predetermined output current, the control circuit may be configured to set (step 803) the input power received at the input terminals to less than the maximum available power (i.e., decrease the input power in response to the difference between the output current and the predetermined current increasing, and increase the input power towards the maximum available power in response to the difference between the output current and the predetermined current decreasing). In certain variations, the predetermined output current values may be selected such that the output power of module 302 or string 303 is as shown in FIG. 8D. The predetermined output voltage values versus output power may be selected in a similar way. While FIG. 8D illustrates one possible embodiment, other embodiments may present MPPT module 107 with other output power versus current (or voltage) curves that have one or more local maximum to which the MPPT 107 can track and lock (e.g., converge). In this way, maximum power point tracking circuit 107, if present, may stably track (step 805) the voltage and/or current point or range. When a maximum is reached (decision block 807), MPPT tracking circuit 107 locks (step 809) onto the power point (e.g., the "predetermined point" in FIG. 8D).

Figure 9:
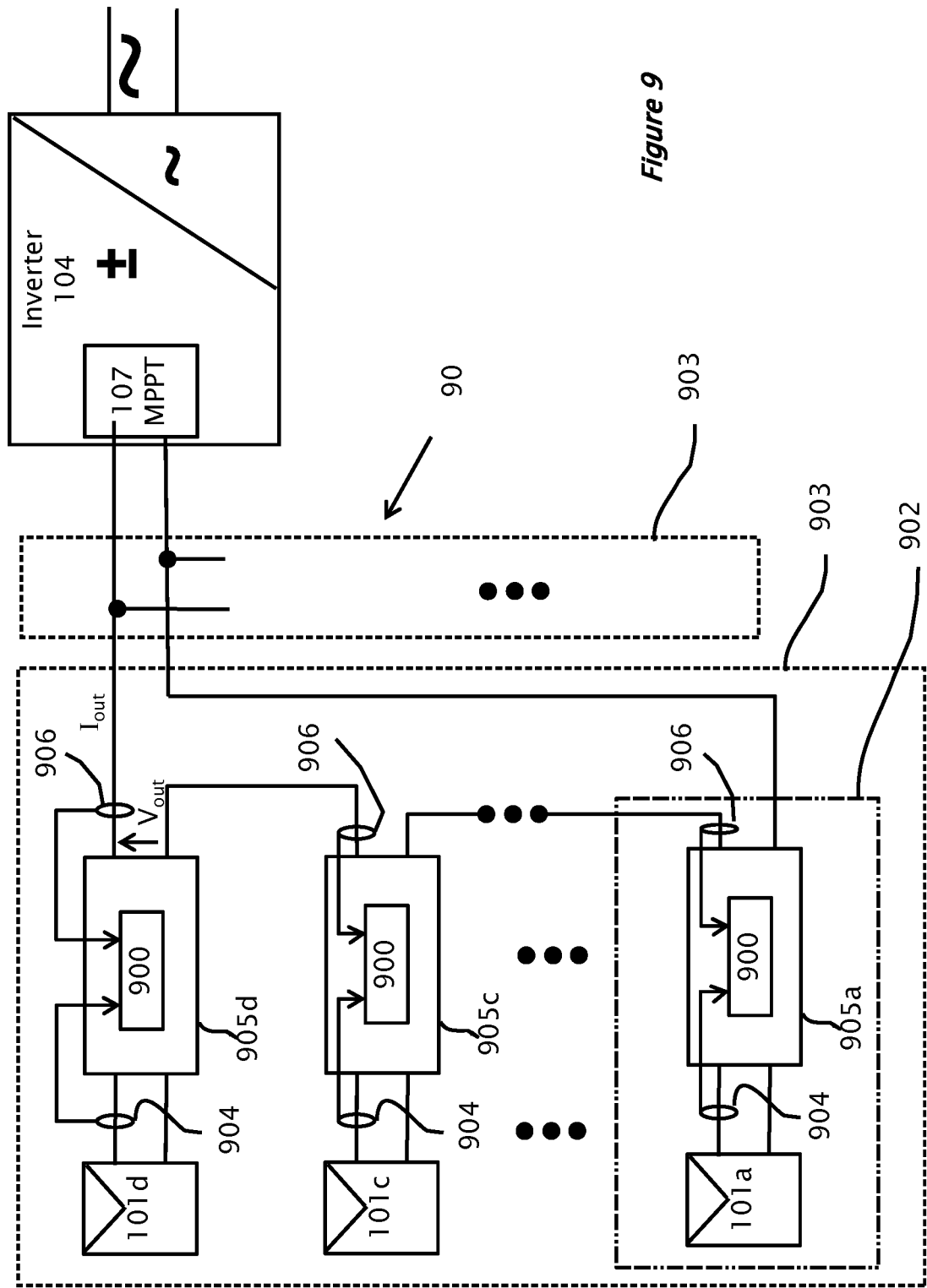
FIG. 9 illustrates in a simplified block diagram of a distributed power harvesting system according to various embodiments.

Reference is now made to FIG. 9, which illustrates in a simplified block diagram a photovoltaic distributed power harvesting system 90 including photovoltaic panels 101 a101d connected respectively to power converter circuits 905a-905d. One solar panel 101 together with its associated connected power converter circuit 905 forms a photovoltaic module 902. Each converter 905a-905d adapts to the power characteristics of the connected solar panel 905a-905d and transfers the power efficiently from converter input to converter output. Each converter 905a-905d includes a control circuit 900 that receives a feedback signal from input sensor 904. Specifically, input current sensors and/or voltage sensors 904 are used to provide the feedback to control circuit 900. Control circuit 900 may also receive a signal from output current and/or output voltage sensors 906.

Inverter 104 with integrated MPPT module 107 is designed to be connected directly to the outputs with series/parallel connections of conventional solar panels 101 as in conventional system 10 of FIG. 1.

Although photovoltaic modules 902 may be designed to be integrated with inverters 304 it may be advantageous that each panel module 902 may also be integrated with a respective conventional inverter (similar to inverter 104) between the converter 905 output and the serially connected outputs of module 902 (not illustrated). System 90 includes a series and/or parallel connection between outputs of strings 903 input to a conventional inverter 104 with an integrated MPPT module 107.

Reference is now made to FIG. 8G, which illustrates another method 821 for operating modules 902, and/or strings 903 with inverter 104 equipped with an MPPT module 107. In step 823, a scan is made by control circuit 900 making a variation of the voltage conversion ratio between input voltage and output voltage (Vout) of a power converter circuit 905. During the variation, multiple measurements may be made (step 825) of the input and/or output power (e.g., by measuring input and output current and voltage) of converter 905 for different voltage conversion ratios that are set by control circuit 900 during the variation. The power measurements made for each different voltage conversion ratio may then be used to determine (step 827) the maximum power point of the connected photovoltaic source. From the determination of the maximum power point of the connected photovoltaic source, the voltage conversion ratio for the maximum point may be used to set (step 829) the conversion ratio for a continued operation of converter 905. The continued operation of converter 905 continues for a time period (step 831) before applying another variation of the voltage conversion ratio in step 823.

Reference is now made to flow diagrams of FIGS. 9a and 9b, according to various aspects. Power converter 905 may control output voltage by varying (step 811) the output voltage from power converter 905. The input voltage to power converter 905 may be maintained at the maximum power point. The conversion ratio defined as the ratio of input voltage to output voltage may be varied or perturbed to slowly approach (step 811) maximum power on the output terminals. The term "slowly" as used herein is relative to the response time of MPPT circuit 107 associated with load 104. The conversion ratio or output voltage may be selected.

By adjusting the conversion ratio of the power converter, the efficiency of the converter can be adjusted, thereby increasing or decreasing the output power for a received input power. Thus, in one example, while a maximum power point is maintained at the power converter input, the output can be adjusted to increase the output power to provide a maximum power point for MPPT 107 (e.g., predetermined point in FIG. 81)).

Since the output power from power converter 905 approaches slowly maximum power, MPPT circuit 107 responds accordingly and locks onto the output voltage at maximum output power. Referring now to FIG. 9b, in the meantime MPPT circuit 107 associated with load 104 tracks the slow variation of output power from photovoltaic modules 902. In FIG. 9c, a graph is shown which indicates the slow variation of output power from photovoltaic modules 902, which varies typically over many seconds (DT).

According to various embodiments, the processes of 9a and 9b may be performed in conjunction with other previously described embodiments to move the maximum power point presented to the inputs of MPPT circuit 107. For example, the maximum point illustrated in FIG. 81) or (other maximum point) may be shifted to a different current and/or voltage such that maximum power is maintained over changing power production and conversion conditions (e.g., light, temperature, faults, etc.) of systems 30/40/50/80/90. The rate of adapting the system (e.g., moving the peak) is slower than the tracking rate of MPPT 107, such that the MPPT maintains lock (e.g., convergence) on the current/voltage/power at its input of inverter 104 within the power peak (e.g., the "maximum point" in FIG. 81)).

Reference is now made to FIGS. 10A and 10B, which together illustrate another process that allows systems 30/90 to be integrated with inverter 104 equipped with MPPT circuit 107. In FIG. 10A, MPPT circuit 107 perturbs (step 191) voltage or current across string 303. Control circuit 900 senses (step 195) the voltage or current perturbation of MPPT circuit 107. Control circuit 900 via sensor 906 in step 197 slowly maximizes output power at a particular voltage conversion ratio of converter 905. Input power from a photovoltaic panel 101 may be maximized. In decision block 817, a maximum output power is being reached and in step 193 MPPT 107 locks onto the maximum output power.

The articles "a", "an", as used hereinafter are intended to mean and be equivalent to "one or more" or "at least one", For instance, "a direct current (DC) power source" means "one or more direct current (DC) power sources".

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or sub combination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

We claim:

1. An apparatus comprising:
   a power converter having input terminals and output terminals and being operative to convert input power received from a direct current power source at the input terminals to output power at the output terminals; and
   a control circuit configured to:
      control the power converter to draw the input power according to a maximum power point tracking algorithm; and
      while drawing the input power according to the maximum power point tracking algorithm, vary the output power to present, for a first time period, a maximum output power point and to present, for a second time period, a reduced output power point.

2. The apparatus of claim 1, wherein the control circuit is configured to decrease, while maintaining the input power at a maximum input power point, the output power from the maximum output power point to the reduced output power point.

3. The apparatus of claim 1, wherein the control circuit is configured to vary the output power to present the reduced output power point by adjusting conversion efficiency of the power converter.

4. The apparatus of claim 1, wherein the control circuit is configured to decrease, based on determining that a voltage value or a current value of the output terminals is being outside of a predetermined range, the output power to the reduced output power point.

5. The apparatus of claim 4, wherein the control circuit is configured to increase the output power from the reduced output power point to a higher output power point,
   wherein the voltage value or the current value of the output terminals is within the predetermined range after the increase of the output power.

6. The apparatus of claim 4, wherein the control circuit is configured to lock onto an output power point lower than the maximum output power point to mantain the voltage value or the current value of the output terminals within the predetermined range.

7. The apparatus of claim 1, wherein a rate of varying the output power is slower than a rate of tracking of a maximum power point tracking circuit that is configured to track the output power.

8. The apparatus of claim 1, wherein the direct current power source comprises a photovoltaic solar panel or a photovoltaic solar cell, and wherein the control circuit is configured to control the power converter to draw, according to the maximum power point tracking algorithm, the input power at a maximum input power point, and wherein the maximum input power point varies according a changing condition associated with the photovoltaic solar panel or the photovoltaic solar cell.

9. A system comprising:

a plurality of power converters; and an inverter configured to receive combined power output from the plurality of power converters, and to track a variation of the combined power, wherein at least one of the plurality of power converters comprises:

input terminals;

output terminals;

a power converting circuit configured to convert input power received from a direct current power source at the input terminals to output power at the output terminals; and a control circuit configured to:

control the at least one of the plurality of power converters to draw the input power according to a maximum power point tracking algorithm and while drawing the input power according to the maximum power point tracking algorithm, vary the output power to present, for a first time period, a maximum output power point and to present, for a second time period, a reduced output power point.

10. The system of claim 9, wherein the control circuit is configured to decrease, while maintaining the input power at a maximum input power point, the output power from the maximum output power point to the reduced output power point, and wherein the reduced output power point is associated with a maximum combined power point for the inverter.

11. The system of claim 9, wherein the control circuit is configured to vary the output power to present the reduced output power point by adjusting conversion efficiency of the power converting circuit.

12. The system of claim 9, wherein the control circuit is configured to decrease, based on determining that a voltage value or a current value of the output terminals is being outside of a predetermined range, the output power to the reduced output power point.

13. The system of claim 12, wherein the control circuit is configured to increase the output power from the reduced output power point to a higher output power point, wherein the voltage value or the current value of the output terminals is within the predetermined range after the increase of the output power.

14. The system of claim 12, wherein the control circuit is configured to lock onto an output power point lower than the maximum output power point to maintain the voltage value or the current value of the output terminals within the predetermined range.

15. The system of claim 9, wherein a rate of varying the output power is slower than a rate of tracking of a maximum power point tracking circuit, of the inverter, that is configured to track the output power.

16. The system of claim 9, wherein the direct current power source comprises a photovoltaic solar panel or a photovoltaic solar cell, and wherein the control circuit is configured to control the at least one of the plurality of power converters to draw, according to the maximum power point tracking algorithm, the input power at a maximum input power point, and wherein the maximum input power point varies according a changing condition associated with the photovoltaic solar panel or the photovoltaic solar cell.

17. A method comprising:

converting input power, received from a direct current power source, at input terminals of a power converter to output power at output terminals of the power converter;

drawing the input power according to a maximum power point tracking algorithm; and varying, by a control circuit and while drawing the input power according to the maximum power point tracking algorithm, the output power to present, for a first time period, a maximum output power point and to present, for a second time period, a reduced output power point.

18. The method of claim 17, wherein varying the output power comprises decreasing, while maintaining the input power at a maximum input power point, the output power from the maximum output power point to the reduced output power point.

19. The method of claim 17, wherein varying the output power comprises varying the output power to present the reduced output power point by adjusting conversion efficiency of the power converter.

20. The method of claim 17, wherein varying the output power comprises decreasing, based on determining that a voltage value or a current value of the output terminals is being outside of a predetermined range, the output power to the reduced output power point.

21. The method of claim 20, wherein varying the output power further comprises increasing the output power from the reduced output power point to a higher output power point, wherein the voltage value or the current value of the output terminals is within the predetermined range after increasing the output power to the higher output power point.

22. The method of claim 20, wherein varying the output power further comprises locking onto an output power point lower than the maximum output power point to maintain the voltage value or the current value of the output terminals within the predetermined range.

23. The method of claim 17, wherein a rate of varying the output power is slower than a rate of tracking of a maximum power point tracking circuit that is configured to track the output power.

24. The method of claim 17, wherein the direct current power source comprises a photovoltaic solar panel or a photovoltaic solar cell, wherein drawing the input power comprises drawing, according to the maximum power point tracking algorithm, the input power at a maximum input power point, and wherein the maximum input power point varies according to a changing condition associated with the photovoltaic solar panel or the photovoltaic solar cell.

* * * * *